US008893033B2

(12) United States Patent
Donahue et al.

(10) Patent No.: US 8,893,033 B2
(45) Date of Patent: Nov. 18, 2014

(54) APPLICATION NOTIFICATIONS

(75) Inventors: Tyler J. Donahue, Bellevue, WA (US); Brian K McNeil, Seattle, WA (US); Kevin Michael Woley, Seattle, WA (US); Matthew R. Ayers, Seattle, WA (US); Gaurav S. Anand, Seattle, WA (US); Anshul Rawat, Kirkland, WA (US); Relja Ivanovic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 44 days.

(21) Appl. No.: 13/118,204

(22) Filed: May 27, 2011

(65) Prior Publication Data

US 2012/0304116 A1 Nov. 29, 2012

(51) Int. Cl.
G06F 3/048 (2013.01)
G06F 3/0481 (2013.01)
G06F 3/0484 (2013.01)

(52) U.S. Cl.
CPC ........ *G06F 3/04817* (2013.01); *G06F 3/04842* (2013.01)
USPC ........... 715/772; 715/808; 715/810; 715/825; 715/826; 715/835; 715/837; 715/764; 715/765

(58) Field of Classification Search
CPC . G06F 3/0481; G06F 3/0482; G06F 3/04817; G06F 9/4443; H04W 4/12; H04W 8/245; H04L 12/5895; H04M 1/72547; H04M 1/72525; H04F 9/542; H04F 9/546
USPC ......... 715/808, 810, 837, 825, 826, 835, 764, 715/765, 772; 455/412.1, 412.2, 418; 719/318
See application file for complete search history.

(56) References Cited

U.S. PATENT DOCUMENTS

| 4,823,283 | A | 4/1989 | Diehm et al. |
| 5,045,997 | A | 9/1991 | Watanabe |
| 5,046,001 | A | 9/1991 | Barker et al. |
| 5,189,732 | A | 2/1993 | Kondo |

(Continued)

FOREIGN PATENT DOCUMENTS

| CN | 1734440 | 2/2006 |
| CN | 1902575 | 1/2007 |

(Continued)

OTHER PUBLICATIONS

"International Search Report", Mailed Date: May 9, 2012, Application No. PCT/US2011/055520, Filed Date: Oct. 9, 2011, pp. 8.

(Continued)

*Primary Examiner* — Weilun Lo
*Assistant Examiner* — Rashedul Hassan
(74) *Attorney, Agent, or Firm* — Bryan Webster; Kate Drakos; Micky Minhas

(57) ABSTRACT

Application notification techniques are described. Implementations are described in which a representation of an application may include notifications that pertain to the application. Techniques are further described which may be used to manage the notifications, including replacement of notifications, use of queues, overrides, selection of notifications based on execution state of an application, cycling a display of a plurality of notifications, cycling a display of different subsets of notifications, examination of a manifest of an application to determine criteria to be used to display the notifications, display priority of the notifications, and so on.

20 Claims, 12 Drawing Sheets

(56) References Cited

U.S. PATENT DOCUMENTS

| | | | |
|---|---|---|---|
| 5,258,748 A | 11/1993 | Jones | |
| 5,297,032 A | 3/1994 | Trojan et al. | |
| 5,321,750 A | 6/1994 | Nadan | |
| 5,339,392 A | 8/1994 | Risberg et al. | |
| 5,432,932 A | 7/1995 | Chen et al. | |
| 5,463,725 A | 10/1995 | Henckel et al. | |
| 5,485,197 A | 1/1996 | Hoarty | |
| 5,495,566 A | 2/1996 | Kwatinetz | |
| 5,515,495 A | 5/1996 | Ikemoto | |
| 5,574,836 A | 11/1996 | Broemmelsiek | |
| 5,598,523 A | 1/1997 | Fujita | |
| 5,611,060 A | 3/1997 | Belfiore et al. | |
| 5,623,613 A | 4/1997 | Rowe et al. | |
| 5,640,176 A | 6/1997 | Mundt et al. | |
| 5,650,827 A | 7/1997 | Tsumori et al. | |
| 5,657,049 A | 8/1997 | Ludolph et al. | |
| 5,675,329 A | 10/1997 | Barker | |
| 5,687,331 A | 11/1997 | Volk et al. | |
| 5,712,995 A | 1/1998 | Cohn | |
| 5,771,042 A | 6/1998 | Santos-Gomez | |
| 5,793,415 A | 8/1998 | Gregory et al. | |
| 5,819,284 A | 10/1998 | Farber et al. | |
| 5,844,547 A | 12/1998 | Minakuchi et al. | |
| 5,860,073 A | 1/1999 | Ferrel et al. | |
| 5,905,492 A | 5/1999 | Straub et al. | |
| 5,914,720 A | 6/1999 | Maples et al. | |
| 5,940,076 A | 8/1999 | Sommers et al. | |
| 5,959,621 A | 9/1999 | Nawaz et al. | |
| 5,963,204 A | 10/1999 | Ikeda et al. | |
| 6,008,809 A | 12/1999 | Brooks | |
| 6,008,816 A | 12/1999 | Eisler | |
| 6,009,519 A | 12/1999 | Jones et al. | |
| 6,011,542 A | 1/2000 | Durrani et al. | |
| 6,028,600 A | 2/2000 | Rosin et al. | |
| 6,057,839 A | 5/2000 | Advani et al. | |
| 6,064,383 A | 5/2000 | Skelly | |
| 6,104,418 A | 8/2000 | Tanaka et al. | |
| 6,108,003 A | 8/2000 | Hall, Jr. et al. | |
| 6,111,585 A | 8/2000 | Choi | |
| 6,115,040 A | 9/2000 | Bladow et al. | |
| 6,166,736 A | 12/2000 | Hugh | |
| 6,188,405 B1 | 2/2001 | Czerwinski et al. | |
| 6,211,921 B1 | 4/2001 | Cherian et al. | |
| 6,212,564 B1 | 4/2001 | Harter et al. | |
| 6,216,141 B1 | 4/2001 | Straub et al. | |
| 6,266,098 B1 | 7/2001 | Cove et al. | |
| 6,278,448 B1 | 8/2001 | Brown et al. | |
| 6,281,940 B1 | 8/2001 | Sciammarella | |
| 6,311,058 B1 | 10/2001 | Wecker et al. | |
| 6,369,837 B1 | 4/2002 | Schirmer | |
| 6,385,630 B1 | 5/2002 | Ejerhed | |
| 6,396,963 B2 | 5/2002 | Shaffer | |
| 6,411,307 B1 | 6/2002 | Rosin et al. | |
| 6,424,338 B1 | 7/2002 | Andersone | |
| 6,426,753 B1 | 7/2002 | Migdal | |
| 6,433,789 B1 | 8/2002 | Rosman | |
| 6,448,987 B1 | 9/2002 | Easty et al. | |
| 6,449,638 B1 | 9/2002 | Wecker et al. | |
| 6,456,334 B1 | 9/2002 | Duhault | |
| 6,489,977 B2 | 12/2002 | Sone | |
| 6,505,243 B1 * | 1/2003 | Lortz | 709/220 |
| 6,507,643 B1 | 1/2003 | Groner | |
| 6,510,144 B1 | 1/2003 | Dommety et al. | |
| 6,510,466 B1 | 1/2003 | Cox et al. | |
| 6,510,553 B1 | 1/2003 | Hazra | |
| 6,538,635 B1 | 3/2003 | Ringot | |
| 6,570,597 B1 | 5/2003 | Seki et al. | |
| 6,577,323 B1 | 6/2003 | Jamieson et al. | |
| 6,577,350 B1 | 6/2003 | Proehl et al. | |
| 6,591,244 B2 | 7/2003 | Jim et al. | |
| 6,597,374 B1 | 7/2003 | Baker et al. | |
| 6,628,309 B1 | 9/2003 | Dodson et al. | |
| 6,636,246 B1 | 10/2003 | Gallo et al. | |
| 6,662,023 B1 | 12/2003 | Helle | |
| 6,675,387 B1 | 1/2004 | Boucher et al. | |
| 6,690,387 B2 | 2/2004 | Zimmerman et al. | |
| 6,697,825 B1 | 2/2004 | Underwood et al. | |
| 6,707,449 B2 | 3/2004 | Hinckley et al. | |
| 6,710,771 B1 | 3/2004 | Yamaguchi et al. | |
| 6,721,958 B1 | 4/2004 | Dureau | |
| 6,724,403 B1 | 4/2004 | Santoro et al. | |
| 6,784,925 B1 | 8/2004 | Tomat | |
| 6,798,421 B2 | 9/2004 | Baldwin | |
| 6,801,203 B1 | 10/2004 | Hussain | |
| 6,807,558 B1 | 10/2004 | Hassett et al. | |
| 6,832,355 B1 | 12/2004 | Duperrouzel et al. | |
| 6,857,104 B1 | 2/2005 | Cahn | |
| 6,865,297 B2 | 3/2005 | Loui | |
| 6,873,329 B2 | 3/2005 | Cohen et al. | |
| 6,876,312 B2 | 4/2005 | Yu | |
| 6,885,974 B2 | 4/2005 | Holle | |
| 6,904,597 B2 | 6/2005 | Jin | |
| 6,920,445 B2 | 7/2005 | Bae | |
| 6,938,101 B2 | 8/2005 | Hayes et al. | |
| 6,961,731 B2 | 11/2005 | Holbrook | |
| 6,971,067 B1 | 11/2005 | Karson et al. | |
| 6,972,776 B2 | 12/2005 | Davis et al. | |
| 6,975,306 B2 | 12/2005 | Hinckley | |
| 6,976,210 B1 | 12/2005 | Silva et al. | |
| 6,978,303 B1 | 12/2005 | McCreesh et al. | |
| 6,983,310 B2 | 1/2006 | Rouse | |
| 6,987,991 B2 | 1/2006 | Nelson | |
| 7,013,041 B2 | 3/2006 | Miyamoto | |
| 7,017,119 B1 | 3/2006 | Johnston et al. | |
| 7,019,757 B2 | 3/2006 | Brown et al. | |
| 7,028,264 B2 | 4/2006 | Santoro et al. | |
| 7,032,187 B2 | 4/2006 | Keely, Jr. et al. | |
| 7,036,090 B1 | 4/2006 | Nguyen | |
| 7,036,091 B1 | 4/2006 | Nguyen | |
| 7,042,460 B2 | 5/2006 | Hussain et al. | |
| 7,051,291 B2 | 5/2006 | Sciammarella et al. | |
| 7,058,955 B2 | 6/2006 | Porkka | |
| 7,065,385 B2 | 6/2006 | Jarrad et al. | |
| 7,065,386 B1 | 6/2006 | Smethers | |
| 7,075,535 B2 | 7/2006 | Aguera y Arcas | |
| 7,089,507 B2 | 8/2006 | Lection et al. | |
| 7,091,998 B2 | 8/2006 | Miller-Smith | |
| 7,093,201 B2 | 8/2006 | Duarte | |
| 7,106,349 B2 | 9/2006 | Baar et al. | |
| 7,111,044 B2 | 9/2006 | Lee | |
| 7,133,707 B1 | 11/2006 | Rak | |
| 7,133,859 B1 | 11/2006 | Wong | |
| 7,139,800 B2 | 11/2006 | Bellotti et al. | |
| 7,146,573 B2 | 12/2006 | Brown et al. | |
| 7,155,729 B1 | 12/2006 | Andrew et al. | |
| 7,158,123 B2 | 1/2007 | Myers et al. | |
| 7,158,135 B2 | 1/2007 | Santodomingo et al. | |
| 7,178,111 B2 | 2/2007 | Glein et al. | |
| 7,194,506 B1 | 3/2007 | White et al. | |
| 7,210,099 B2 | 4/2007 | Rohrabaugh et al. | |
| 7,216,588 B2 | 5/2007 | Suess | |
| 7,249,326 B2 | 7/2007 | Stoakley et al. | |
| 7,262,775 B2 | 8/2007 | Calkins et al. | |
| 7,263,668 B1 | 8/2007 | Lentz | |
| 7,280,097 B2 | 10/2007 | Chen | |
| 7,283,620 B2 | 10/2007 | Adamczyk | |
| 7,289,806 B2 | 10/2007 | Morris et al. | |
| 7,296,184 B2 | 11/2007 | Derks et al. | |
| 7,296,242 B2 | 11/2007 | Agata et al. | |
| 7,310,100 B2 | 12/2007 | Hussain | |
| 7,333,092 B2 | 2/2008 | Zadesky et al. | |
| 7,333,120 B2 | 2/2008 | Venolia | |
| 7,336,263 B2 | 2/2008 | Valikangas | |
| 7,369,647 B2 | 5/2008 | Gao et al. | |
| 7,376,907 B2 | 5/2008 | Santoro et al. | |
| 7,386,807 B2 | 6/2008 | Cummins et al. | |
| 7,388,578 B2 | 6/2008 | Tao | |
| 7,403,191 B2 | 7/2008 | Sinclair | |
| 7,408,538 B2 | 8/2008 | Hinckley et al. | |
| 7,412,663 B2 | 8/2008 | Lindsay et al. | |
| 7,433,920 B2 | 10/2008 | Blagsvedt et al. | |
| 7,447,520 B2 | 11/2008 | Scott | |
| 7,461,151 B2 | 12/2008 | Colson et al. | |
| 7,469,380 B2 | 12/2008 | Wessling et al. | |

(56) References Cited

U.S. PATENT DOCUMENTS

| | | |
|---|---|---|
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,500,175 B2 | 3/2009 | Colle et al. |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,676,767 B2 | 3/2010 | Hofmeister et al. |
| 7,702,683 B1 | 4/2010 | Kirshenbaum |
| 7,755,674 B2 | 7/2010 | Kaminaga |
| 7,834,861 B2 | 11/2010 | Lee |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,086,275 B2 | 12/2011 | Wykes |
| 8,108,781 B2 | 1/2012 | Laansoo et al. |
| 8,131,808 B2 | 3/2012 | Aoki et al. |
| 8,150,924 B2 | 4/2012 | Buchheit et al. |
| 8,171,431 B2 | 5/2012 | Grossman et al. |
| 8,175,653 B2 | 5/2012 | Smuga |
| 8,176,438 B2 | 5/2012 | Zaman et al. |
| 8,209,623 B2 | 6/2012 | Barletta et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,250,494 B2 | 8/2012 | Butcher |
| 8,255,473 B2 | 8/2012 | Eren et al. |
| 8,255,812 B1 | 8/2012 | Parparita et al. |
| 8,269,736 B2 | 9/2012 | Wilairat |
| 8,307,279 B1 | 11/2012 | Fioravanti et al. |
| 8,384,726 B1 | 2/2013 | Grabowski et al. |
| 8,429,565 B2 | 4/2013 | Agarawala et al. |
| 8,448,083 B1 | 5/2013 | Migos et al. |
| 8,473,870 B2 | 6/2013 | Hinckley et al. |
| 8,473,871 B1 | 6/2013 | Sandler et al. |
| 8,525,808 B1 | 9/2013 | Buening |
| 8,539,384 B2 | 9/2013 | Hinckley et al. |
| 8,548,431 B2 | 10/2013 | Teng et al. |
| 8,560,959 B2 | 10/2013 | Zaman et al. |
| 8,589,815 B2 | 11/2013 | Fong et al. |
| 8,612,874 B2 | 12/2013 | Zaman et al. |
| 8,627,227 B2 | 1/2014 | Matthews et al. |
| 8,687,023 B2 | 4/2014 | Markiewicz et al. |
| 8,689,123 B2 | 4/2014 | Zaman et al. |
| 8,830,270 B2 | 9/2014 | Zaman et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway |
| 2002/0054117 A1* | 5/2002 | van Dantzich et al. ........ 345/766 |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097264 A1 | 7/2002 | Dutta et al. |
| 2002/0105531 A1 | 8/2002 | Niemi |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1* | 10/2002 | Kaars .......................... 705/14 |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0174396 A1 | 9/2004 | Jobs et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0250217 A1 | 12/2004 | Tojo et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1* | 6/2005 | Klassen et al. ................ 715/765 |
| 2005/0143138 A1 | 6/2005 | Lee et al. |
| 2005/0149879 A1 | 7/2005 | Jobs et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |

(56) References Cited

U.S. PATENT DOCUMENTS

| | | |
|---|---|---|
| 2006/0059430 A1 | 3/2006 | Bells |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0246955 A1 | 11/2006 | Nirhamo |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0284852 A1 | 12/2006 | Hofmeister et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire |
| 2007/0050724 A1 | 3/2007 | Lee et al. |
| 2007/0054679 A1 | 3/2007 | Cho et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0157089 A1 | 7/2007 | Van Os et al. |
| 2007/0171192 A1 | 7/2007 | Seo et al. |
| 2007/0180381 A1 | 8/2007 | Rice |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1* | 8/2007 | Shenfield et al. .......... 455/412.2 |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0225022 A1 | 9/2007 | Satake |
| 2007/0233654 A1 | 10/2007 | Karlson |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1* | 11/2007 | Shenfield ................ 709/203 |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2008/0001924 A1 | 1/2008 | de los Reyes et al. |
| 2008/0005668 A1 | 1/2008 | Mavinkurve |
| 2008/0028294 A1 | 1/2008 | Sell et al. |
| 2008/0032681 A1 | 2/2008 | West |
| 2008/0036743 A1 | 2/2008 | Westerman |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0065607 A1 | 3/2008 | Weber |
| 2008/0072173 A1 | 3/2008 | Brunner et al. |
| 2008/0076472 A1 | 3/2008 | Hyatt |
| 2008/0082911 A1 | 4/2008 | Sorotokin et al. |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0094368 A1 | 4/2008 | Ording et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1* | 5/2008 | Kannan et al. ................ 370/312 |
| 2008/0109753 A1 | 5/2008 | Karstens |
| 2008/0113656 A1 | 5/2008 | Lee et al. |
| 2008/0114535 A1 | 5/2008 | Nesbitt |
| 2008/0122796 A1 | 5/2008 | Jobs |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0225014 A1 | 9/2008 | Kim |
| 2008/0242362 A1 | 10/2008 | Duarte |
| 2008/0259042 A1 | 10/2008 | Thorn |

(56) References Cited

U.S. PATENT DOCUMENTS

| | | |
|---|---|---|
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0083656 A1 | 3/2009 | Dokhon |
| 2009/0085851 A1 | 4/2009 | Lim |
| 2009/0085878 A1 | 4/2009 | Heubel |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0094562 A1 | 4/2009 | Jeong et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0125844 A1 | 5/2009 | Weir et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0284657 A1 | 11/2009 | Roberts et al. |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0322760 A1 | 12/2009 | Kwiatkowski et al. |
| 2009/0327969 A1 | 12/2009 | Estrada |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0057566 A1 | 3/2010 | Itzhak |
| 2010/0058248 A1 | 3/2010 | Park |
| 2010/0066698 A1 | 3/2010 | Seo |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1* | 4/2010 | Krishnaprasad et al. ..... 711/144 |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0138767 A1 | 6/2010 | Wang et al. |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0216491 A1 | 8/2010 | Winkler et al. |
| 2010/0223569 A1 | 9/2010 | Vuong et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0265196 A1 | 10/2010 | Lee et al. |
| 2010/0281402 A1 | 11/2010 | Staikos et al. |
| 2010/0281409 A1 | 11/2010 | Rainisto |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0295795 A1 | 11/2010 | Wilairat |
| 2010/0298034 A1 | 11/2010 | Shin et al. |
| 2010/0302148 A1 | 12/2010 | Tanabe et al. |
| 2010/0302172 A1 | 12/2010 | Wilairat |

(56) References Cited

U.S. PATENT DOCUMENTS

| | | | |
|---|---|---|---|
| 2010/0302176 A1 | 12/2010 | Nikula et al. | |
| 2010/0302278 A1 | 12/2010 | Shaffer et al. | |
| 2010/0311470 A1 | 12/2010 | Seo et al. | |
| 2010/0313165 A1 | 12/2010 | Louch et al. | |
| 2010/0321403 A1 | 12/2010 | Inadome | |
| 2010/0328431 A1 | 12/2010 | Kim et al. | |
| 2010/0329642 A1 | 12/2010 | Kam et al. | |
| 2010/0333008 A1 | 12/2010 | Taylor | |
| 2011/0004839 A1 | 1/2011 | Cha et al. | |
| 2011/0004845 A1 | 1/2011 | Ciabarra | |
| 2011/0018806 A1 | 1/2011 | Yano | |
| 2011/0029598 A1* | 2/2011 | Arnold et al. | 709/203 |
| 2011/0029904 A1 | 2/2011 | Smith et al. | |
| 2011/0029927 A1 | 2/2011 | Lietzke et al. | |
| 2011/0029934 A1 | 2/2011 | Locker et al. | |
| 2011/0035702 A1 | 2/2011 | Williams et al. | |
| 2011/0043527 A1 | 2/2011 | Ording et al. | |
| 2011/0055773 A1 | 3/2011 | Agarawala et al. | |
| 2011/0074699 A1 | 3/2011 | Marr et al. | |
| 2011/0074710 A1 | 3/2011 | Weeldreyer et al. | |
| 2011/0074719 A1 | 3/2011 | Yeh et al. | |
| 2011/0078624 A1 | 3/2011 | Missig et al. | |
| 2011/0087988 A1 | 4/2011 | Ray et al. | |
| 2011/0093778 A1 | 4/2011 | Kim et al. | |
| 2011/0093816 A1 | 4/2011 | Chang et al. | |
| 2011/0093821 A1 | 4/2011 | Wigdor et al. | |
| 2011/0107272 A1 | 5/2011 | Aguilar | |
| 2011/0113337 A1 | 5/2011 | Liu et al. | |
| 2011/0113486 A1 | 5/2011 | Hunt et al. | |
| 2011/0119586 A1 | 5/2011 | Blinnikka et al. | |
| 2011/0126156 A1 | 5/2011 | Krishnaraj et al. | |
| 2011/0154235 A1 | 6/2011 | Min et al. | |
| 2011/0157027 A1 | 6/2011 | Rissa | |
| 2011/0161845 A1 | 6/2011 | Stallings et al. | |
| 2011/0163968 A1 | 7/2011 | Hogan | |
| 2011/0167341 A1 | 7/2011 | Cranfill et al. | |
| 2011/0173556 A1 | 7/2011 | Czerwinski et al. | |
| 2011/0173568 A1* | 7/2011 | Royal et al. | 715/825 |
| 2011/0173569 A1 | 7/2011 | Howes et al. | |
| 2011/0175930 A1 | 7/2011 | Hwang et al. | |
| 2011/0179386 A1 | 7/2011 | Shaffer et al. | |
| 2011/0179387 A1 | 7/2011 | Shaffer et al. | |
| 2011/0185318 A1 | 7/2011 | Hinckley et al. | |
| 2011/0191675 A1 | 8/2011 | Kauranen | |
| 2011/0202866 A1 | 8/2011 | Huang et al. | |
| 2011/0209039 A1 | 8/2011 | Hinckley et al. | |
| 2011/0209089 A1 | 8/2011 | Hinckley et al. | |
| 2011/0209099 A1 | 8/2011 | Hinckley | |
| 2011/0209100 A1 | 8/2011 | Hinckley et al. | |
| 2011/0209101 A1 | 8/2011 | Hinckley et al. | |
| 2011/0209102 A1 | 8/2011 | Hinckley et al. | |
| 2011/0209103 A1 | 8/2011 | Hinckley et al. | |
| 2011/0209104 A1 | 8/2011 | Hinckley et al. | |
| 2011/0225547 A1 | 9/2011 | Fong et al. | |
| 2011/0231796 A1 | 9/2011 | Vigil | |
| 2011/0252346 A1 | 10/2011 | Chaudhri | |
| 2011/0252380 A1 | 10/2011 | Chaudhri | |
| 2011/0252381 A1* | 10/2011 | Chaudhri | 715/838 |
| 2011/0276864 A1 | 11/2011 | Oules | |
| 2011/0316884 A1 | 12/2011 | Giambalvo et al. | |
| 2012/0005584 A1 | 1/2012 | Seago et al. | |
| 2012/0009903 A1* | 1/2012 | Schultz et al. | 455/412.2 |
| 2012/0028687 A1 | 2/2012 | Wykes | |
| 2012/0050185 A1 | 3/2012 | Davydov et al. | |
| 2012/0050332 A1 | 3/2012 | Nikara et al. | |
| 2012/0089950 A1 | 4/2012 | Tseng | |
| 2012/0102433 A1* | 4/2012 | Falkenburg | 715/835 |
| 2012/0151397 A1 | 6/2012 | Oberstein et al. | |
| 2012/0159395 A1* | 6/2012 | Deutsch et al. | 715/835 |
| 2012/0159402 A1 | 6/2012 | Nurmi et al. | |
| 2012/0167008 A1* | 6/2012 | Zaman et al. | 715/814 |
| 2012/0167011 A1 | 6/2012 | Zaman | |
| 2012/0174005 A1 | 7/2012 | Deutsch | |
| 2012/0174029 A1 | 7/2012 | Bastide et al. | |
| 2012/0176401 A1 | 7/2012 | Hayward et al. | |
| 2012/0179992 A1 | 7/2012 | Smuga | |
| 2012/0180001 A1 | 7/2012 | Griffin et al. | |
| 2012/0210265 A1 | 8/2012 | Delia et al. | |
| 2012/0212495 A1 | 8/2012 | Butcher | |
| 2012/0216139 A1 | 8/2012 | Ording et al. | |
| 2012/0233571 A1 | 9/2012 | Wever et al. | |
| 2012/0244841 A1 | 9/2012 | Teng | |
| 2012/0254780 A1 | 10/2012 | Mouton | |
| 2012/0265644 A1 | 10/2012 | Roa et al. | |
| 2012/0284673 A1 | 11/2012 | Lamb et al. | |
| 2012/0290962 A1 | 11/2012 | Zielinski et al. | |
| 2012/0299968 A1 | 11/2012 | Wong et al. | |
| 2012/0304068 A1 | 11/2012 | Zaman et al. | |
| 2012/0304092 A1 | 11/2012 | Jarrett et al. | |
| 2012/0304107 A1 | 11/2012 | Nan et al. | |
| 2012/0304108 A1 | 11/2012 | Jarrett et al. | |
| 2012/0304113 A1 | 11/2012 | Patten et al. | |
| 2012/0304114 A1 | 11/2012 | Wong et al. | |
| 2012/0304117 A1 | 11/2012 | Donahue et al. | |
| 2012/0304118 A1 | 11/2012 | Donahue et al. | |
| 2012/0304131 A1 | 11/2012 | Nan et al. | |
| 2012/0304132 A1 | 11/2012 | Sareen et al. | |
| 2012/0304133 A1 | 11/2012 | Nan et al. | |
| 2012/0311485 A1 | 12/2012 | Caliendo, Jr. et al. | |
| 2012/0323992 A1 | 12/2012 | Brobst et al. | |
| 2013/0033525 A1 | 2/2013 | Markiewicz et al. | |
| 2013/0042203 A1 | 2/2013 | Wong et al. | |
| 2013/0042206 A1 | 2/2013 | Zaman et al. | |
| 2013/0044141 A1 | 2/2013 | Markiewicz | |
| 2013/0047079 A1 | 2/2013 | Kroeger et al. | |
| 2013/0047105 A1 | 2/2013 | Jarrett | |
| 2013/0047117 A1 | 2/2013 | Deutsch | |
| 2013/0047126 A1 | 2/2013 | Sareen | |
| 2013/0057587 A1 | 3/2013 | Leonard et al. | |
| 2013/0057588 A1 | 3/2013 | Leonard | |
| 2013/0063442 A1 | 3/2013 | Zaman | |
| 2013/0063443 A1 | 3/2013 | Garside | |
| 2013/0063465 A1 | 3/2013 | Zaman | |
| 2013/0063490 A1* | 3/2013 | Zaman et al. | 345/649 |
| 2013/0067381 A1 | 3/2013 | Yalovsky | |
| 2013/0067390 A1 | 3/2013 | Kwiatkowski | |
| 2013/0067391 A1 | 3/2013 | Pittappilly | |
| 2013/0067398 A1 | 3/2013 | Pittappilly | |
| 2013/0067399 A1 | 3/2013 | Elliott | |
| 2013/0067412 A1 | 3/2013 | Leonard | |
| 2013/0067420 A1 | 3/2013 | Pittappilly | |
| 2013/0093757 A1 | 4/2013 | Cornell | |
| 2013/0117715 A1 | 5/2013 | Williams et al. | |
| 2014/0082552 A1 | 3/2014 | Zaman | |
| 2014/0109008 A1 | 4/2014 | Zaman | |

FOREIGN PATENT DOCUMENTS

| | | |
|---|---|---|
| CN | 101114303 | 1/2008 |
| CN | 101809531 | 8/2010 |
| CN | 102004603 | 4/2011 |
| CN | 102033710 | 4/2011 |
| CN | 102197702 | 9/2011 |
| CN | 102460370 | 5/2012 |
| EP | 0583060 | 2/1994 |
| EP | 1752868 | 2/2007 |
| JP | 2004227393 | 8/2004 |
| JP | 2004357257 | 12/2004 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| KR | 20100010072 | 2/2010 |
| KR | 20100048375 | 5/2010 |
| KR | 20100056369 | 5/2010 |
| KR | 1020100056369 | 5/2010 |

(56) References Cited

FOREIGN PATENT DOCUMENTS

| TW | 201023026 | 6/2010 |
|---|---|---|
| WO | WO-9926127 | 5/1999 |
| WO | WO-0129976 | 4/2001 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2009000043 | 12/2008 |
| WO | WO-2009012398 | 1/2009 |
| WO | WO-2009049331 | 4/2009 |
| WO | WO-2010024969 | 3/2010 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010125451 | 11/2010 |
| WO | WO-2010135155 | 11/2010 |
| WO | WO-2011041885 | 4/2011 |

OTHER PUBLICATIONS

Denoue, Laurent et al., "WebNC: Efficient Sharing of Web Applications", *In Proceedings of WWW 2009*, Available at <http://www.fxpal.com/publications/FXPAL-PR-09-495.pdf>,(2009),2 pages.
Fisher, Bill "Cool Discussion of Push Notifications—Toast and Tile—on Windows Phone", Retrieved from: <http://www.windowsphoneexpert.com/Connection/forums/p/4153/18399.aspx> on Sep. 29, 2010, (May 3, 2010),3 pages.
Paul, Ryan "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, (Aug. 2010),3 pages.
Vornberger, Jan "Bluetile", Retrieved from: <http://www.bluetile.org> on Sep. 29, 2010, 5 pages.
"Adobe Acrobat 8 Standard User Guide", Adobe Systems Incorporated,(2007),pp. 34 & 36.
"Advisory Action", U.S. Appl. No. 12/414,382, (Jan. 20, 2012), 3 pages.
"Advisory Action", U.S. Appl. No. 12/433,605, (Apr. 5, 2012), 3 pages.
"Alltel Adds Dedicated Search Key to Phones", Retrieved from: <http://www.phonescoop.com/news/item.php?n=2159> on Nov. 26, 2008., (Apr. 12, 2007), 2 Pages.
"Android 2.3 Users Guide", AUG-2.3-103, Android mobile technology platform 2.3,(Dec. 13, 2010), 380 pages.
"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007), 11 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008), 3 pages.
"Basics of Your Device: Get Familiar with the Home Screen", Nokia USA—How to, retrieved from <http://www.nokia.ca/get-support-and-software/product-support/c6-01/how-to#> on May 11, 2011, 3 pages.
"Blackberry office tools: Qwerty Convert", Retrieved from: <http://blackberrysoftwarelist.net/blackberry/download-software/blackberry-office/qwerty_convert.aspx> on Nov. 20, 2008, 1 page.
"Calc4M", Retrieved from: <http://www.hellebo.com/Calc4M.html> on Dec. 11, 2008, (Sep. 10, 2008), 4 Pages.
"Content-Centric E-Mail Message Analysis in Litigation Document Reviews", Retrieved from: <http://www.busmanadement.com/article/Issue-14/Data-Management/Content-Centric-E-Mail-Message-Analysis-in-Litigation-Document-Reviews/> on May 6, 2009, 5 Pages.

"Dial a number", Retrieved from: <http://www.phonespell.org/ialhelp.html> on Nov. 20, 2008, 1 page.
"DuoSense™ Multi-Touch Gestures", Retrieved from: <http://www.n-trig.com/Data/Uploads/Misc/DuoSenseMTG_final.pdf>, (Jul. 2008), 4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009), 2 pages.
"Exclusive: Windows Mobile 7 to Focus on Touch and Motion Gestures", Retrieved from: <http://anti-linux.blodspot.com/2008/08/exclusive-windows-mobile-7-to-focus-on.html> on May 6, 2009, (Aug. 1, 2008), 14 pages.
"Extended European Search Report", European Patent Application No. 09818253.8, (Apr. 10, 2012), 7 pages.
"Final Office Action", U.S. Appl. No. 12/244,545, (Dec. 7, 2011), 16 pages.
"Final Office Action", U.S. Appl. No. 12/244,545, (Sep. 7, 2012), 23 pages.
"Final Office Action", U.S. Appl. No. 12/413,977, (Nov. 17, 2011), 16 pages.
"Final Office Action", U.S. Appl. No. 12/414,382, (Dec. 23, 2011), 7 pages.
"Final Office Action", U.S. Appl. No. 12/414,476, (Dec. 1, 2011), 20 pages.
"Final Office Action", U.S. Appl. No. 12/433,605, (Feb. 3, 2012), 11 pages.
"Final Office Action", U.S. Appl. No. 12/433,667, (Sep. 13, 2011), 17 pages.
"Final Office Action", U.S. Appl. No. 12/469,458, (Nov. 17, 2011), 15 pages.
"Final Office Action", U.S. Appl. No. 12/469,480, (Feb. 9, 2012), 17 pages.
"Final Office Action", U.S. Appl. No. 12/484,799, (Apr. 30, 2012), 13 pages.
"Final Office Action", U.S. Appl. No. 12/560,081, (Mar. 14, 2012), 16 pages.
"Freeware.mobi", Retrieved from: <http://www.palmfreeware.mobi/download-palette.html> on Nov. 6, 2008, (Oct. 9, 2001), 2 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007), 24 pages.
"HTC Shows HTC Snap with Snappy Email Feature", Retrieved from: <http://www.wirelessandmobilenews.com/smartphones/ on May 5, 2009>, (May 4, 2009), 10 Pages.
"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008), 11 pages.
"International Search Report and Written Opinion", International Application No. PCT/US2011/055514, (May 22, 2012), 8 pages.
"International Search Report", Application No. PCT/US2010/028553, Application Filing Date: Mar. 24, 2010,(Nov. 9, 2010), 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introduction to Windows Touch", Retrieved from: <http://download.microsoft.com/download/a/d/f/adf1347d-08dc-41a4-9084-623b1194d4b2/Win7_touch_docx> (Dec. 18, 2008), pp. 1-7.
"iPod touch User Guide for iPhone OS 3.0 Software", Apple Inc.,(2009), 153 pages.
"Keyboard (5)", Retrieved from: <http://landru.uwaterloo.ca/cgi-bin/man.cgi?section=5&topic=keyboard> on Dec. 11, 2008., (Aug. 11, 1997), 8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005), 5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new

(56) References Cited

OTHER PUBLICATIONS chrome for the kiosk browser, Kiosk Project Kiosk Browser Chrome Customization Firefox-2.x,(Aug. 16, 2007), 2 pages.

"Live Photo Gallery—Getting Started—from Camera to Panorama", Retrieved from: <http://webdotwiz.spaces.live.com/blog/cns!2782760752B93233!1729.entry> on May 5, 2009., (Sep. 2008), 7 Pages.

"MIDTB Tip Sheet: Book Courier", Retrieved from: <http://www.midtb.org/tipsbookcourier.htm> on Dec. 11, 2008., (Sep. 26, 2005),6 Pages.

"Mobile/UI/Designs/TouchScreen", Retrieved from: <https://wiki.mozilla.org/Mobile/UI/Designs/TouchScreen> on May 6, 2009., (Feb. 3, 2009), 15 Pages.

"Multi-touch", Retrieved from <http://en.wikipedia.org/wiki/Multi-touch#Microsoft_Surface> on Apr. 24, 2009, (Apr. 17, 2009), 8 pages.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006), 2 Pages.

"Non-Final Office Action", U.S. Appl. No. 11/215,052, (Jun. 23, 2011), 17 pages.

"Non-Final Office Action", U.S. Appl. No. 11/502,264, (Sep. 14, 2012), 14 pages.

"Non-Final Office Action", U.S. Appl. No. 12/244,545, (Mar. 27, 2012), 18 pages.

"Non-Final Office Action", U.S. Appl. No. 12/244,545, (Aug. 17, 2011), 15 pages.

"Non-Final Office Action", U.S. Appl. No. 12/413,977, (Jul. 19, 2011), 17 pages.

"Non-Final Office Action", U.S. Appl. No. 12/413,977, (Jul. 20, 2012), 18 pages.

"Non-Final Office Action", U.S. Appl. No. 12/414,382, (Jul. 26, 2011), 9 pages.

"Non-Final Office Action", U.S. Appl. No. 12/414,434, (Jan. 17, 2012), 7 pages.

"Non-Final Office Action", U.S. Appl. No. 12/414,434, (May 31, 2012), 7 pages.

"Non-Final Office Action", U.S. Appl. No. 12/414,434, (Aug. 2, 2011), 6 pages.

"Non-Final Office Action", U.S. Appl. No. 12/414,455, (Aug. 29, 2011), 8 pages.

"Non-Final Office Action", U.S. Appl. No. 12/414,458, (Jul. 6, 2011), 8 pages.

"Non-Final Office Action", U.S. Appl. No. 12/414,476, (Nov. 9, 2012), 22 pages.

"Non-Final Office Action", U.S. Appl. No. 12/414,476, (Aug. 3, 2011), 21 pages.

"Non-Final Office Action", U.S. Appl. No. 12/433,605, (Jun. 24, 2011), 10 pages.

"Non-Final Office Action", U.S. Appl. No. 12/433,667, (Jun. 7, 2011), 15 pages.

"Non-Final Office Action", U.S. Appl. No. 12/433,667, (Feb. 3, 2012), 16 pages.

"Non-Final Office Action", U.S. Appl. No. 12/469,419, (Nov. 9, 2011), 15 pages.

"Non-Final Office Action", U.S. Appl. No. 12/469,419, (May 23, 2012), 13 pages.

"Non-Final Office Action", U.S. Appl. No. 12/469,458, (Jul. 1, 2011), 15 pages.

"Non-Final Office Action", U.S. Appl. No. 12/469,458, (Sep. 21, 2012), 14 pages.

"Non-Final Office Action", U.S. Appl. No. 12/469,480, (Oct. 17, 2012), 16 pages.

"Non-Final Office Action", U.S. Appl. No. 12/469,480, (Sep. 22, 2011), 14 pages.

"Non-Final Office Action", U.S. Appl. No. 12/470,558, (Nov. 22, 2011), 9 pages.

"Non-Final Office Action", U.S. Appl. No. 12/480,969, (Aug. 7, 2012), 15 pages.

"Non-Final Office Action", U.S. Appl. No. 12/484,799, (Aug. 11, 2011), 12 pages.

"Non-Final Office Action", U.S. Appl. No. 12/484,799, (Aug. 7, 2012), 13 pages.

"Non-Final Office Action", U.S. Appl. No. 12/484,845, (Dec. 7, 2011), 16 pages.

"Non-Final Office Action", U.S. Appl. No. 12/560,081, (Dec. 7, 2011), 16 pages.

"Non-Final Office Action", U.S. Appl. No. 12/983,106, (Nov. 9, 2012), 17 pages.

"Non-Final Office Action", U.S. Appl. No. 13/492,495, (Sep. 17, 2012), 8 pages.

"Notice of Allowance", U.S. Appl. No. 11/215,052, (Mar. 14, 2012), 5 pages.

"Notice of Allowance", U.S. Appl. No. 12/414,382, (Apr. 4, 2012), 4 pages.

"Notice of Allowance", U.S. Appl. No. 12/414,434, (Aug. 17, 2012), 4 pages.

"Notice of Allowance", U.S. Appl. No. 12/414,455, (Jan. 4, 2012), 4 pages.

"Notice of Allowance", U.S. Appl. No. 12/414,458, (Oct. 31, 2011), 2 pages.

"Notice of Allowance", U.S. Appl. No. 12/414,458, (Nov. 29, 2011), 2 pages.

"Notice of Allowance", U.S. Appl. No. 12/414,458, (Aug. 10, 2011), 6 pages.

"Notice of Allowance", U.S. Appl. No. 12/470,558, (Apr. 2, 2012), 7 pages.

"Notice of Allowance", U.S. Appl. No. 12/470,558, (Aug. 23, 2012), 2 pages.

"Notice of Allowance", U.S. Appl. No. 12/484,799, (Oct. 22, 2012), 10 pages.

"Notice of Allowance", U.S. Appl. No. 12/484,845, (Mar. 16, 2012), 5 pages.

"Oracle8i Application Developers Guide—Advanced Queuing Release 2 (8.1.6)", Retrieved from: http://www.cs.otago.ac.nz/oradocs/appdev.817/a76938/adq0lin5.htm on May 6, 2009., (Dec. 1999), 8 pages.

"Oracle8i Application Developer's Guide—Advanced Queuing", Retrieved from: http://www.cs.umbc.edu/help/oracle8/server.815/a68005/03_adq1i.htm on May 6, 2009., (Feb. 1999), 29 Pages.

"Oracle8i Concepts Release 8.1.5", Retrieved from: http://www.cs.umbc.edu/help/oracle8/server.815/a67781/c16queue.htm on May 6, 2009., (Feb. 1999), 10 Pages.

"Palette Extender 1.0.2", Retrieved from: <http://palette-extender.en.softonic.com/symbian> on Nov. 6, 2008, (Jan. 21, 2003), 2 pages.

"Parallax Scrolling", Retrieved from: <http://en.wikipedia.org/wiki/Parallax_scrolling> on May 5, 2009., (May 4, 2009), 3 Pages.

"PCT Search Report and Written Opinion", Application No. PCT/US2009/061382, (May 26, 2010), 10 pages.

"PCT Search Report and Written Opinion", Application No. PCT/US2009/061735, (Jun. 7, 2010), 11 pages.

"PCT Search Report and Written Opinion", Application No. PCT/US2010/028699, (Oct. 4, 2010), 10 pages.

"PCT Search Report and Written Opinion", Application No. PCT/US2010/028555, (Oct. 12, 2010), 10 pages.

"PCT Search Report and Written Opinion", Application No. PCT/US2010/034772, (Dec. 29, 2010), 12 pages.

"PCT Search Report and Written Opinion", Application No. PCT/US2011/055523, (May 10, 2012), 9 pages.

"PCT Search Report and Written Opinion", Application No. PCT/US2011/055513, (Mar. 27, 2012), 8 pages.

"PCT Search Report and Written Opinion", Application No. PCT/US2011/055512, (May 24, 2012), 8 pages.

"PCT Search Report and Written Opinion", Application No. PCT/US2011/055524, (Jun. 1, 2012), 8 pages.

"PCT Search Report and Written Opinion", Application No. PCT/US2011/065702, (Aug. 29, 2012), 8 pages.

"PCT Search Report and Written Opinion", Application No. PCT/US2011/055712, (Sep. 21, 2012), 9 pages.

"PCT Search Report and Written Opinion", Application No. PCT/US2011/055736, (Sep. 17, 2012), 8 pages.

(56) References Cited

OTHER PUBLICATIONS

"PCT Search Report and Written Opinion", Application No. PCT/US2011/055496, (Sep. 12, 2012), 9 pages.
"PCT Search Report and Written Opinion", Application No. PCT/US2011/067073, (Sep. 17, 2012), 8 pages.
"PCT Search Report and Written Opinion", Application No. PCT/US2011/055746, (Sep. 27, 2012), 9 pages.
"PCT Search Report and Written Opinion", Application No. PCT/US2011/055725, (Sep. 27, 2012), 10 pages.
"PCT Search Report and Written Opinion", Application No. PCT/US2011/055478, (Sep. 27, 2012), 9 pages.
"PCT Search Report and Written Opinion", Application No. PCT/US2011/055493, (Sep. 26, 212), 9 pages.
"PCT Search Report and Written Opinion". PCT Application No. PCT/US2010/038730, (Jan. 19, 2011), 8 pages.
"PCT Search Report", Application Serial No. PCT/US2009/061864, (May 14, 2010), 10 pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005), 5 Pages.
"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, (Dec. 15, 2008), 3 pages.
"Snap", *Windows 7 Features*, retrieved from <http://windows.microsoft.com/en-US/windows7/products/features/snap> on Sep. 23, 2011, 2 pages.
"Symbian Applications", Retrieved from: <http://symbianfullversion.blogspot.com/2008_12_01_archive.html> on May 5, 2009., (Jan. 2009), 51 Pages.
"Top 3 Task Switchers for Android", *TechCredo*, retrieved from <http://www.techcredo.com/android/top-3-task-switchers-for-android> on May 11, 2011,(Mar. 9, 2011), 5 pages.
"Top Android App: Swipepad", *Best Android Apps Review*, retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., (Feb. 23, 2009), 2 Pages.
"Windows Phone 7 (Push Notification)", retrieved from <http://unknownerror.net/2011-06/windows-7-push-notification-36520> on Jul. 6, 2011, 4 pages.
"Winterface Review", Retrieved from: <http://www.mytodayscreen.com/winterface-review/> on Nov. 12, 2008, (Jul. 9, 2008), 42 pages.
"Womma", Retrieved from: <http://www.womma.org/blog/links/wom-trends/> on May 5, 2009., (2007), 70 Pages.
"Working with Multiple Windows", *MSOFFICE tutorial!*, retrieved from <http://www.msoffice-tutorial.com/working-with-multiple-windows.php> on Sep. 23, 2011, 3 pages.
Beiber, Gerald et al., "Screen Coverage: A Pen-Interaction Problem for PDA's and Touch Screen Computers", In Proceedings of ICWMC 2007,(Mar. 2007), 6 pages.
Damien, "7 Ways to Supercharge Multitasking in Android", retrieved from <http://maketecheasier.com/7-ways-to-supercharge-multitasking-in-android/2011/01/22/> on May 11, 2011,(Jan. 22, 2011), 5 pages.
Dolcourt, Jessica "Webware", Retrieved from: <http://news.cnet.com/webware/?categcyId=2010> on May 5, 2009., 13 Pages.
Gade, Lisa "Samsung Alias u740", Retrieved from: <http://www.mobiletechreview.com/phones/Samsung-U740.htm> on Nov. 20, 2008, (Mar. 14, 2007), 6 pages.
Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007), pp. 1-42.
Ha, Rick et al., "SMIKEYS: An Efficient Keypad Configuration for Mobile Communications", Retrieved from: <http://ieeexplore.ieee.org/stamp/stamp.jsp?arnumber=01362557.> on Dec. 17, 2008, (Nov. 2004), 7 Pages.

Harrison, Richard "Symbian OS C++ for Mobile Phones vol. 3", Retrieved from: <http://_www.amazon.co.uk/Symbian-OS-Mobile-Phones-Press/dp/productdescription/0470066415> on Oct. 23, 2008, Symbian Press,(Jun. 16, 2003), 4 pages.
Hickey, Andrew R., "Google Android has Landed; T-Mobile, HTC Unveil G1", Retrieved from: <http://www.crn.com/retail/210603348> on Nov. 26, 2008., (Sep. 23, 2008), 4 pages.
Kcholi, Avi "Windows CE .NET Interprocess Communication", Retrieved from http://msdn.microsoft.com/en-us/library/ms836784.aspx on Jul. 17, 2008., (Jan. 2004), 15 Pages.
La, Nick "Parallax Gallery", Available at <http://webdesignerwall.comtutorials/parallax-gallery/comment-page-1>,(Apr. 25, 2008), 16 pages.
Mann, Richard et al., "Spectrum Analysis of Motion Parallax in a 3D Cluttered Scene and Application to Egomotion", *Journal of the Optical Society of America A*, vol. 22, No. 9, Available at <http://www.cs.uwaterloo.ca/~mannr/snow/josa-mann-langer.pdf>,(Sep. 2005), pp. 1717-1731.
Mantia, Louie "Multitasking: What Does It Mean?", retrieved from <http://mantia.me/blog/multitasking/> on Sep. 23, 2011, 3 pages.
Mao, Jeng "Comments on Verizon Wireless Messaging Services, LLC", Retrieved from: http://www.ntia.doc.gov/osmhome/warnings/comments/verizon.htm on May 6, 2009., (Aug. 18, 2000), 5 Pages.
Marie, Angelina "MacBook Trackpad Four Fingers Swipe Left/Right to Switch Applications", *MacBook Junkie*, retrieved from <http://www.macbookjunkie.com/macbook-trackpad-four-fingers-swipe-left-right-to-switch-applications/> on May 11, 2011,(Nov. 13, 2010), 4 pages.
Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (Dec. 26, 2006), pp. 1757-1760.
Nordgren, Peder "Development of a Touch Screen Interface for Scania Interactor", *Master's Thesis in Computing Science*, UMEA University, Available at <http://www.cs.umu.se/education/examina/Rapporter/PederNordgren.pdf>,(Apr. 10, 2007), pp. 1-59.
Oliver, Sam "Potential iPhone Usability and Interface Improvements", Retrieved from: <http://www.appleinsider.com/articles/08/09/18/potential_iphone_usability_and_interface_improvents.html> on Nov. 12, 2008, AppleInsider,(Sep. 18, 2008), 4 pages.
Oryl, Michael "Review: Asus P527 Smartphone for North America", Retrieved from: <http://www.mobileburn.com/review.jsp?Id=4257> on Dec. 17, 2008., (Mar. 5, 2008), 1 Page.
Padilla, Alfredo "Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007), 4 Pages.
Raghaven, Gopal et al., "Model Based Estimation and Verification of Mobile Device Performance", Available at http://alumni.cs.ucsb.edu/~raimisl/emsoft04_12.pdf.,(Sep. 27-29, 2004), 10 Pages.
Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008, (Apr. 2, 2008), 1 page.
Remond, Mickael "Mobile Marketing Solutions", Retrieved from:. <http://www.mobilemarketingmagazine.co.uk/mobile_social_networking/> on May 5, 2009., (Apr. 28, 2009), 16 Pages.
Rice, Stephen V., et al., "A System for Searching Sound Palettes", *Proceedings of the Eleventh Biennial Symposium on Arts and Technology,*, Available at <http://www.comparisonics.com/FindSoundsPalettePaper.pdf>,(Feb. 2008), 6 pages.
Roberts, Neil "Touching and Gesturing on the iPhone", Available at <http://www.sitepen.com/blog/2008/07/10/touching-and-gesturing-on-the-iphone/comments-pare-1>,(Jul. 10, 2008), 16 pages.
Singh, Kundan et al., "CINEMA: Columbia InterNet Extensible Multimedia Architecture", Available at <http://www1.cs.columbia.edu/~library/TR-repository/reports/reports-2002/cucs-011-02.pdf>,(Sep. 3, 2002), 83 Pages.
Steinicke, Frank et al., "Multi-Touching 3D Data: Towards Direct Interaction in Stereoscopic Display Environments coupled with Mobile Devices", *Advanced Visual Interfaces (AVI) Workshop on Designing Multi-Touch Interaction Techniques for Coupled Public,*

(56) References Cited

OTHER PUBLICATIONS

Available at <http://viscg.uni-muenster.de/publications/2008/SHSK08/ppd-workshop.-pdf.>,(Jun. 15, 2008), 4 Pages.
Suror, "PocketShield—New Screenlock App for the HTC Diamond and Pro", Retrieved from: <http://wmpoweruser.com/?tag=htc-touch-diamond> on Jun. 28, 2011, (Oct. 23, 2008), 2 pages.
Terpstra, Brett "Beta Beat: Grape, a New Way to Manage Your Desktop Clutter", Retrieved from: Beta Beat: Grape, a New Way to Manage Your Desktop Clutter on Jun. 28, 2011, (Apr. 14, 2009), 4 pages.
Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004), pp. 1-13.
Vermeulen, Jan "BlackBerry PlayBook Hands-on", retrieved from <http://mybroadband.co.za/news/gadgets/20104-BlackBerry-PlayBook-hands-.html> on May 11, 2011,(May 8, 2011), 4 pages.
Viticci, Federico "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011,(Jul. 6, 2011), 6 pages.
Wilson, Tracy V., "How the iPhone Works", Retrieved from: <http://electronics.howstuffworks.com/iphone2.htm> on Apr. 24, 2009, (Jan. 2007), 9 pages.
Wobbrock, Jacob O., et al., "User-Defined Gestures for Surface Computing", *CHI 2009*, Apr. 4-9, 2009, Boston, MA, available at <http://faculty.washington.edu/wobbrock/pubs/chi-09.2.pdf>,(Apr. 4, 2009), 10 pages.
Wyatt, Paul "/Flash/the art of parallax scrolling", .net Magazine,(Aug. 1, 2007), pp. 74-76.
Yang, Seungji et al., "Semantic Photo Album Based on MPEG-4 Compatible Application Format", Retrieved from: <http://ieeexplore.ieee.org/stamp/stamp.jsp?arnumber=04146254.>, (2007), 2 Pages.
"Non-Final Office Action", U.S. Appl. No. 12/972,967, (Jan. 30, 2013), 19 pages.
"Non-Final Office Action", U.S. Appl. No. 12/977,584, (Dec. 7, 2012), 8 pages.
"Non-Final Office Action", U.S. Appl. No. 12/978,184, (Jan. 23, 2013), 7 pages.
"Non-Final Office Action", U.S. Appl. No. 13/196,272, (Feb. 6, 2013), 10 pages.
"Non-Final Office Action", U.S. Appl. No. 13/224,258, (Jan. 8, 2013), 35 pages.
"Non-Final Office Action", U.S. Appl. No. 13/492,495, (Dec. 19, 2012), 6 pages.
"Non-Final Office Action", U.S. Appl. No. 13/655,386, (Dec. 26, 2012), 23 pages.
"Non-Final Office Action", U.S. Appl. No. 13/656,354, (Feb. 6, 2013), 10 pages.
"Non-Final Office Action", U.S. Appl. No. 13/656,574, (Jan. 31, 2013), 21 pages.
"Non-Final Office Action", U.S. Appl. No. 13/657,621, (Feb. 7, 2013), 19 pages.
"Non-Final Office Action", U.S. Appl. No. 13/657,646, (Jan. 3, 2013), 13 pages.
"Non-Final Office Action", U.S. Appl. No. 13/657,789, (Jan. 9, 2013), 38 pages.
"PCT Search Report and Written Opinion", Application No. PCT/US2011/067075, (Dec. 12, 2012),10 pages.
"Restriction Requirement", U.S. Appl. No. 13/658,694, (Feb. 6, 2013),6 pages.
Livingston, et al., "Windows 95 Secrets", *1995, IDG Books Worldwide, 3rd Edition*, (1995), pp. 121-127.
Perry, Greg "Teach Yourself Windows 95 in 24 Hours", *1997, Sams Publishing, 2nd Edition*, (1997), pp. 193-198.
"PCT Search Report and Written Opinion", Application No. PCT/US2011/055521, (May 15, 2012), 9 pages.
"PCT Search Report and Written Opinion", Application No. PCT/US2011/055522, (May 15, 2012), 9 pages.
"PCT Search Report and Written Opinion", Application No. PCT/US2011/055511, (Apr. 24, 2012), 9 pages.
Carrera, et al., "Conserving Disk Energy in Network Servers", Retrieved at <<http://citeseerx.ist.psu.edu/viewdoc/download-?doi=10.1.1.6.8301&rep=rep1&type=ps>>, Proceedings of the 17th annual international conference on Supercomputing, Jun. 21-26, 2003, pp. 1-15.
"Achieving a Superior Ownership Experience in Manageability and Quality for Siebel CRM", Retrieved at <<http://www.oracle.com/us/products/enterprise-manager/superior-exp-for-siebel-crm-068962.pdf>>, Aug. 2008, pp. 25.
"eXtreme Energy Conservation: Advanced Power-Saving Software for Wireless Devices", Retrieved at <<http://www.freescale.com/files/32bit/doc/white_paper/XTMENRGYCNSVWP.pdf>>, Feb. 2006, pp. 15.
"Notifications", Retrieved at <<http://msdn.microsoft.com/en-us/library/aa511497.aspx>>, Retrieved Date: May 10, 2011, pp. 16.
"Application User Model IDs", Retrieved from: <http://msdn.microsoft.com/en-us/library/dd378459(VS.85).aspx> on Sep. 28, 2010, 6 pages.
"Class ScrollView", Retrieved from: <http://www.blackberry.com/developers/docs/6.0.0api/net/rim/device/api/ui/ScrollView.html> on Sep. 28, 2010, 13 pages.
"Email Notification for Microsoft Outlook and Outlook Express", Retrieved from: <http://www.contextmagic.com/express-notification/> on Sep. 29, 2010, (Jul. 21, 2004),3 pages.
"Enhanced IBM Power Systems Software and PowerVM Restructuring", *IBM United States Announcement 208-082*, dated Apr. 8, 2008, available at <http://www.ibm.com/common/ssi/rep_ca/2/897/ENUS208-082/ENUS208082.PDF>,(Apr. 8, 2008),pp. 1-19.
"Final Office Action", U.S. Appl. No. 11/305,789, (Apr. 1, 2009),10 pages.
"Final Office Action", U.S. Appl. No. 11/502,264, (Feb. 4, 2010),15 pages.
"Final Office Action", U.S. Appl. No. 11/502,264, (Apr. 3, 2009),9 pages.
"GnomeCanvas", Retrieved from: <http://library.gnome.org/devel/libgnomecanvas/unstable/GnomeCanvas.html> on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011,(May 28, 2010),1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, (Sep. 16, 2009),3 pages.
"iPad User Guide", retrieved from <http://cyndidannerkuhn.info/CDK/iPads_Resources_files/iPad_User_Guide.pdf> on Jun. 17, 2011,154 pages.
"Magic mouse", Retrieved from: <http://www.apple.com/magicmouse/> on May 10, 2011,3 pages.
"moGo beta v.0.4", Retrieved from: <http://forum.xda-developers.com/showthread.php?t=375196> on Sep. 27, 2010, (Mar. 7, 2008),10 pages.
"New Features in WhatsUp Gold v12.0", retrieved from <http://www.netbright.co.th/?name=product&file=readproduct&id=12> on Jun. 10, 2011,4 pages.
"Non-Final Office Action", U.S. Appl. No. 11/305,789, (Sep. 21, 2009),5 pages.
"Non-Final Office Action", U.S. Appl. No. 11/502,264, (Sep. 30, 2009),15 pages.
"Notice of Allowance", U.S. Appl. No. 11/305,789, (Nov. 23, 2009),8 pages.
"OmneMon™ System Resource Metrics", retrieved from <http://www.omnesys.com/documents/OmneMonSRM_Brochure.pdf> on Jun. 10, 2011,3 pages.
"ONYX Graphics Announces New ONYX Prepedge Job Preparation Software", retrieved from <http://www.largeformatreview.com/rip-software/433-onyx-graphics-announces-new-onyx-> on May 10, 2011,2 pages.

(56) References Cited

OTHER PUBLICATIONS

"Push Notifications Overview for Windows Phone", Retrieved from: <http://msdn.microsoft.com/en-us/library/ff402558%28VS.92%29.aspx> on Sep. 30, 2010, (Sep. 3, 2010),1 page.

"The Map Screen", retrieved from <http://www.symbianos.org/whereamiusersguide> on Jun. 17, 2011,3 pages.

"User Guide", retrieved from <http://wireframesketcher.com/help/help.html> on Jun. 17, 2011,19 pages.

"Windows 8 Is Gorgeous, But Is It More Than Just a Shell? (Video)", retrieved from <http://techcrunch.com/2011/06/02/windows-8-gorgeous-shell-video/> on Jun. 20, 2011,(Jun. 2, 2011),6 pages.

"Windows Phone 7 Live Tiles", Retrieved from: <http://www.knowyourmobile.com/microsoft/windowsphone7/startscreen/640737/windows_phone_7_live_tiles.html> on May 11, 2011,(Oct. 20, 2010),3 pages.

"YUI 3: ScrollView [beta]", Retrieved from: <http://developer.yahoo.com/yui/3/scrollview/> on Sep. 28, 2010, 5 pages.

Bates, John "A Framework to Support Large-Scale", *University of Cambridge Computer Laboratory*, Available at <http://citeseerx.ist.psu.edu/viewdoc/download?doi=10.1.1.48.1690&rep=rep1&type=pdf>,(1996),8 pages.

Bjork, Staffan et al., "Redefining the Focus and Context of Focus+Context Visualizations", *In Proceedings of INFOVIS 2000*, Available at <http://www.johan.redstrom.se/papers/redefining.pdf>,(Oct. 2000),9 pages.

Bowes, James et al., "Transparency for Item Highlighting", *Faculty of Computing Science*, Dalhousie University, Available at <http://torch.cs.dal.ca/~dearman/pubs/GI2003-bowes,dearman,perkins-paper.pdf>,(2003),2 pages.

Buring, Thorsten "User Interaction with Scatterplots on Small Screens—A Comparative Evaluation of Geometric-Semantic Zoom and Fisheye Distortion", *IEEE Transactions on Visualization and Computer Graphics,* vol. 12, Issue 5, Available at <http://citeseerx.ist.psu.edu/viewdoc/download?doi=10.1.1.134.4568&rep=rep1&type=pdf>,(Sep. 2006),pp. 829-836.

Cawley, Christian "How to Customise Your Windows Phone 7", Retrieved from: <http://www.brighthub.com/mobile/windows-mobile-platform/articles/95213.aspx> on May 10, 2011,(Nov. 12, 2010),3 pages.

Cawley, Christian "Windows Phone 7 Customization Tips and Tricks", retrieved from <http://www.brighthub.com/mobile/windows-mobile-platform/articles/95213.aspx> on Jun. 20, 2011,(May 16, 2011),2 pages.

Cohen, Michael F., et al., "Wang Tiles for Image and Texture Generation", *In Proceedings of SIGGRAPH 2003*, Available <http://research.microsoft.com/en-us/um/people/cohen/WangFinal.pdf>,(2003),8 pages.

Davis, Ashley "A WPF Custom Control for Zooming and Panning", Retrieved from: <http://www.codeproject.com/KB/WPF/zoomandpancontrol.aspx> on Sep. 28, 2010, (Jun. 29, 2010),21 pages.

Delimarsky, Den "Sending Tile Push Notifications on Windows Phone 7", retrieved from <http://mobile.dzone.com/articles/sending-tile-push> on May 10, 2011,(Aug. 25, 2010),2 pages.

Dunsmuir, Dustin "Selective Semantic Zoom of a Document Collection", Available at <http://www.cs.ubc.ca/~tmm/courses/533/projects/dustin/proposal.pdf>,(Oct. 30, 2009),pp. 1-9.

Janecek, Paul et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf>,(Feb. 15, 2005),pp. 1-15.

Long, Todd "Gmail Manager 0.6", Retrieved from: <https://addons.mozilla.org/en-US/firefox/addon/1320/> on Sep. 20, 2010, (Jan. 27, 2010),4 pages.

Ray, Bill "Microsoft Re-Tiles Mobile Platform for Windows 7 Era", retrieved from <http://www.theregister.co.uk/2010/02/15/windows_phone_7_series/> on May 11, 2011,(Feb. 15, 2010),2 pages.

Ritchie, Rene "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, (Jun. 14, 2010),2 pages.

Ritscher, Walt "Using Surface APIs in your WPF application—Part 1", Retrieved from: <http://blog.wpfwonderland.com/2009/06/30/using-surface-apis-in-your-wpf-application/> on Sep. 28, 2010, (Jun. 30, 2009),7 pages.

Sandoval, Guillermo L., "A development platform and execution environment for mobile applications", *Universidad Autónoma de Baja California, School of Chemical Sciences and Engineering*, Available at.<http://citeseerx.ist.psu.edu/viewdoc/download?doi=10.1.1.86.7989&rep=rep1&type=pdf>,(2004),18 pages.

Smith, Greg et al., "GroupBar: The TaskBar Evolved", *Proceedings of OZCHI 2003*, Available at <http://research.microsoft.com/pubs/64316/ozchi2003-groupbar.pdf>,(Nov. 2003),pp. 1-10.

Wilson, Andrew D., "Robust Computer Vision-Based Detection of Pinching for One and Two-Handed Gesture Input", *In Proceedings of UIST 2006*, Available at <http://research.microsoft.com/en-us/um/people/awilson/publications/wilsonuist2006/uist%202006%20taffi.pdf>, (Oct. 2006),4 pages.

"Final Office Action", U.S. Appl. No. 12/721,422, (Mar. 7, 2013),10 pages.

"Final Office Action", U.S. Appl. No. 13/118,339, (Aug. 22, 2013),21 pages.

"Final Office Action", U.S. Appl. No. 13/118,347, (Aug. 15, 2013),25 pages.

"Final Office Action", U.S. Appl. No. 13/656,574, (Aug. 23, 2013), 20 pages.

"Final Office Action", U.S. Appl. No. 13/657,789, (Jun. 21, 2013), 35 pages.

"Non-Final Office Action", U.S. Appl. No. 12/721,422, (Oct. 1, 2012), 7 pages.

"Non-Final Office Action", U.S. Appl. No. 13/073,300, (Jul. 25, 2013), 13 pages.

"Non-Final Office Action", U.S. Appl. No. 13/118,333, (Jul. 5, 2013), 18 pages.

"Notice of Allowance", U.S. Appl. No. 12/721,422, (Jul. 11, 2013), 9 pages.

"Notice of Allowance", U.S. Appl. No. 12/978,184, (Aug. 2, 2013), 5 pages.

"Supplemental Notice of Allowance", U.S. Appl. No. 13/655,390, (Jul. 25, 2013), 2 pages.

"You've Got Mail 1.4 Build", retrieved from <http://www.fileshome.com/Shows_Animation_Plays_Sound_Automatic_N . . . > on Jan. 6, 2010, (Jun. 18, 2007), 2 pages.

Farrugia, Michael et al., "Cell Phone Mini Challenge: Node-Link Animation Award Animating Multivariate Dynamic Social Networks", *IEEE Symposium on Visual Analytics Science and Technology*, Columbus, OH, USA, Oct. 21-23, 2008, 2 pages.

Keranen, Jaakko "OpenGL-based User Interface Toolkit for Symbian Mobile Devices", *Master of Science Thesis*, Tamere University of Technology, Department of Information Technology, (Apr. 6, 2005), 88 pages.

Kurdi, Samer "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, (Jan. 19, 2010), 6 pages.

Kurdi, Samer "WinSplit Revolution", Retrieved from.<http://www.freewaregenius.com/winsplit-revolution/> on Jun. 30, 2013, (Aug. 22, 2007), 4 Pages.

"Final Office Action", U.S. Appl. No. 11/502,264, (Mar. 29, 2013), 16 pages.

"Final Office Action", U.S. Appl. No. 13/655,386, (Jun. 6, 2013), 34 pages.

"Final Office Action", U.S. Appl. No. 13/656,354, (Jun. 17, 2013), 14 pages.

"Final Office Action", U.S. Appl. No. 13/657,646, (May 6, 2013), 12 pages.

"My Favorite Gadgets, System Monitor II", Retrieved from on <http://www.myfavoritegadgets.info/monitors/SystemMonitorII/systemmonitorII.html> on Mar. 12, 2013, (Jun. 8, 2010), 5 pages.

(56) References Cited

OTHER PUBLICATIONS

"Non-Final Office Action", U.S. Appl. No. 13/118,181, (Mar. 4, 2013), 22 pages.
"Non-Final Office Action", U.S. Appl. No. 13/118,221, (Mar. 1, 2013), 22 pages.
"Non-Final Office Action", U.S. Appl. No. 13/118,257, (Mar. 5, 2013), 19 pages.
"Non-Final Office Action", U.S. Appl. No. 13/118,321, (Jun. 10, 2013), 32 pages.
"Non-Final Office Action", U.S. Appl. No. 13/118,339, (Feb. 11, 2013), 15 pages.
"Non-Final Office Action", U.S. Appl. No. 13/118,347, (Feb. 12, 2013), 14 pages.
"Non-Final Office Action", U.S. Appl. No. 13/229,693, (Mar. 12, 2013), 21 pages.
"Non-Final Office Action", U.S. Appl. No. 13/658,694, (Apr. 26, 2013), 13 pages.
"Notice of Allowance", U.S. Appl. No. 12/977,584, (Jun. 19, 2013), 5 pages.
"Notice of Allowance", U.S. Appl. No. 13/492,495, (Apr. 26, 2013), 5 pages.
"Notice of Allowance", U.S. Appl. No. 13/655,390, (May 24, 2013), 5 pages.
"PCT Search Report and Written Opinion", Application No. PCT/US2012/047091, (Dec. 27, 2012), 15 pages.
Bruzzese, J. P., "Using Windows 7, Managing and Monitoring Windows 7—Chapter 11", *Que. Publishing*, (May 5, 2010), 33 pages.
Gralla, Preston "Windows XP Hacks, Chapter 13—Hardware Hacks", *O'Reilly Publishing*, (Feb. 23, 2005), 25 pages.
Horowitz, Michael "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, (May 23, 2010), 7 pages.
"Final Office Action", U.S. Appl. No. 12/972,967, (Oct. 11, 2013), 21 pages.
"Final Office Action", U.S. Appl. No. 12/983,106, (Oct. 7, 2013), 19 pages.
"Final Office Action", U.S. Appl. No. 13/224,258, (Sep. 11, 2013), 37 pages.
"Final Office Action", U.S. Appl. No. 13/229,693, (Sep. 4, 2013), 23 pages.
"Final Office Action", U.S. Appl. No. 13/657,621, (Sep. 10, 2013), 18 pages.
"Final Office Action", U.S. Appl. No. 13/658,694, (Oct. 30, 2013), 17 pages.
"Non-Final Office Action", U.S. Appl. No. 13/228,707, (Oct. 25, 2013), 12 pages.
"Non-Final Office Action", U.S. Appl. No. 13/196,272, (Sep. 3, 2013), 5 pages.
"Non-Final Office Action", U.S. Appl. No. 13/228,876, (Nov. 22, 2013), 14 pages.
"Non-Final Office Action", U.S. Appl. No. 13/229,155, (Nov. 18, 2013), 14 pages.
"Notice of Allowance", U.S. Appl. No. 12/978,184, (Nov. 6, 2013), 5 pages.
"Notice of Allowance", U.S. Appl. No. 13/196,272, (Nov. 8, 2013), 8 pages.
"Supplemental Notice of Allowance", U.S. Appl. No. 12/977,584, (Sep. 16, 2013), 2 pages.
"Supplemental Notice of Allowance", U.S. Appl. No. 12/977,584, (Oct. 11, 2013), 2 pages.
"Supplemental Notice of Allowance", U.S. Appl. No. 13/655,390, (Sep. 19, 2013), 2 pages.
"Non-Final Office Action", U.S. Appl. No. 13/655,390, Dec. 17, 2012, 12 pages.
"Final Office Action", U.S. Appl. No. 13/118,181, Dec. 20, 2013, 18 pages.
"Non-Final Office Action", U.S. Appl. No. 13/658,694, Feb. 13, 2014, 19 pages.
"Non-Final Office Action", U.S. Appl. No. 13/228,888, Feb. 10, 2014, 21 pages.
"Final Office Action", U.S. Appl. No. 13/118,321, Dec. 19, 2013, 30 pages.
"Foreign Office Action", CN Application No. 201110429183.5, Jan. 6, 2014, 10 Pages.
"Foreign Office Action", CN Application No. 201110437542.1, Jan. 6, 2014, 10 Pages.
"Foreign Office Action", CN Application No. 201110454251.3, Dec. 27, 2013, 12 Pages.
"Non-Final Office Action", U.S. Appl. No. 13/118,302, Mar. 4, 2014, 10 pages.
"Non-Final Office Action", U.S. Appl. No. 13/118,314, Feb. 27, 2014, 13 pages.
"Restriction Requirement", U.S. Appl. No. 13/118,265, Feb. 27, 2014, 7 pages.
"Restriction Requirement", U.S. Appl. No. 13/118,288, Mar. 4, 2014, 7 pages.
"Supplemental Notice of Allowance", U.S. Appl. No. 12/978,184, Feb. 25, 2014, 2 pages.
"Foreign Office Action", CN Application No. 201110437572.2, Dec. 3, 2013, 7 pages.
"Final Office Action", U.S. Appl. No. 13/073,300, Apr. 1, 2014, 14 pages.
"Final Office Action", U.S. Appl. No. 13/118,221, Mar. 17, 2014, 21 pages.
"Final Office Action", U.S. Appl. No. 13/118,333, Apr. 23, 2014, 22 pages.
"Final Office Action", U.S. Appl. No. 13/228,707, May 21, 2014, 16 pages.
"Final Office Action", U.S. Appl. No. 13/229,155, Jun. 12, 2014, 15 pages.
"First Examination Report", NZ Application No. 618254, May 20, 2014, 3 Pages.
"Gestures Programming", Retrieved from <http://doc.qt.digia.com/4.6/gestures-overview.html> on May 28, 2014, 2010, 3 pages.
"Image Gestures Example", Retrieved from <http://doc.qt.digia.com/4.6/gestures-imagegestures.html> on May 28, 2014, 2010, 3 pages.
"Non-Final Office Action", U.S. Appl. No. 13/118,265, Jun. 10, 2014, 13 pages.
"Non-Final Office Action", U.S. Appl. No. 13/118,292, Jun. 6, 2014, 25 pages.
"Non-Final Office Action", U.S. Appl. No. 13/228,931, Apr. 7, 2014, 21 pages.
"Non-Final Office Action", U.S. Appl. No. 13/228,945, Apr. 14, 2014, 22 pages.
"Non-Final Office Action", U.S. Appl. No. 13/229,556, Mar. 28, 2014, 12 pages.
"Non-Final Office Action", U.S. Appl. No. 13/229,709, Apr. 7, 2014, 12 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
"Notice of Allowance", U.S. Appl. No. 13/655,386, Apr. 25, 2014, 6 pages.
"QPinchGesture Class Reference", Retrieved from <http://doc.qt.digia.com/4.6/qpinchgesture.html> on May 28, 2014, 2010, 6 pages.
Anson, "Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.
"Final Office Action", U.S. Appl. No. 13/224,258, Jul. 18, 2014, 39 pages.
"Final Office Action", U.S. Appl. No. 13/228,876, Jul. 18, 2014, 15 pages.
"First Examination Report", NZ Application No. 618264, May 20, 2014, 2 pages.
"First Examination Report", NZ Application No. 618269, May 20, 2014, 2 pages.

(56) References Cited

OTHER PUBLICATIONS

"First Examination Report", NZ Application No. 618284, May 20, 2014, 2 pages.
"Foreign Office Action", CN Application No. 201180071186.4, Jun. 13, 2014, 12 pages.
"Non-Final Office Action", U.S. Appl. No. 13/118,288, Jul. 2, 2014, 17 pages.
"Non-Final Office Action", U.S. Appl. No. 13/229,693, Jun. 20, 2014, 25 pages.
"Non-Final Office Action", U.S. Appl. No. 13/229,702, Jul. 3, 2014, 28 pages.
"Non-Final Office Action", U.S. Appl. No. 13/657,621, Jul. 18, 2014, 22 pages.
"Non-Final Office Action", U.S. Appl. No. 13/657,646, Aug. 12, 2014, 14 pages.
"Notice of Allowance", U.S. Appl. No. 13/657,789, Aug. 4, 2014, 16 pages.
"Final Office Action", U.S. Appl. No. 13/118,302, Aug. 15, 2014, 17 pages.
"Final Office Action", U.S. Appl. No. 13/345,383, Jul. 25, 2014, 26 pages.
"Foreign Office Action", CN Application No. 201210317470.1, Jun. 5, 2014, 12 pages.
"Non-Final Office Action", U.S. Appl. No. 13/658,694, Aug. 14, 2014, 26 pages.
"Notice of Allowance", U.S. Appl. No. 13/229,556, Sep. 2, 2014, 12 pages.
"Notice of Allowance", U.S. Appl. No. 13/229,709, Sep. 2, 2014, 4 pages.
"Foreign Office Action", CN Application No. 201110429183.5, Aug. 21, 2014, 13 Pages.
"Final Office Action", U.S. Appl. No. 13/118,314, Sep. 11, 2014, 18 pages.
"Non-Final Office Action", U.S. Appl. No. 12/983,106, Sep. 10, 2014, 19 pages.
"Notice of Allowance", U.S. Appl. No. 13/656,574, Sep. 23, 2014, 7 pages.

* cited by examiner

900

902
Receive a plurality of notifications to be displayed as part of respective representations of a plurality of applications in a user interface

904
Display the plurality of notifications as part of the representations of the applications in the user interface such that different subsets of the notification of the applications are cycled at different points in time

Fig. 9

APPLICATION NOTIFICATIONS

BACKGROUND

The pervasiveness of computing devices is ever increasing. For example, users may interact with a traditional desktop computer, a tablet computer, a mobile phone, and so on to access a variety of functionality for work and personal uses. Additionally, the variety of functionality that is available to users of these devices also continues to increase.

This is especially true in the case of applications. Applications availability was traditionally limited as user's typically purchased the applications from a "bricks and mortar" store. With the advent of application availability via the Internet, the number of applications that are made available to a user increased along with the ease at which the user could access these applications. Accordingly, users may chose and install a large number of applications on the users' computing device.

However, interaction by a user with the applications may be hindered by the number of applications that are installed on the computing device. This may include locating an application of interest as well as accessing functionality of the application. For instance, a user may select a weather application to get weather information, then interact with a news application to catch up on the latest news, and so on through a number of other applications. Consequently, navigation through these applications to locate desired information may take a significant amount of time, which may be further complicated by the number of applications that are available on the computing device.

SUMMARY

Application notification techniques are described. Implementations are described in which a representation of an application may include notifications that pertain to the application. Techniques are further described which may be used to manage the notifications, including replacement of notifications, use of queues, overrides, selection of notifications based on execution state of an application, cycling a display of a plurality of notifications (e.g., by a user or automatically by a computing device), cycling a display of different subsets of notifications, examination of a manifest of an application to determine criteria to be used to display the notifications, display priority of the notifications, and so on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 9 is a flow diagram depicting a procedure in an example implementation in which subsets of notifications are cycled for display as part of respective representations of applications.

DETAILED DESCRIPTION

Overview

Application notifications may be used by applications to display information in a representation of the application (e.g., icon, tile, and so on) without having the user specifically launch the application. For example, a representation of a weather application may include a notification that describes current weather conditions. However, conventional techniques that were utilized to display a notification were often static and therefore did not allow developers to control how the notifications were displayed as part of the representation.

Techniques are described herein, however, that may be used to manage notifications. Additionally, in one or more implementations these techniques may be performed without executing a corresponding application, thereby conserving battery life and increasing performance of computing devices that perform these techniques. The following sections describe examples of a variety of different techniques that relate to application notifications, such as replacement of notifications, use of queues, overrides, selection of notifications based on execution state of an application, cycling a display of a plurality of notifications, cycling a display of different subsets of notifications, examination of a manifest of an application to determine criteria to be used to display the notifications, display priority of the notifications, and so on. Further discussion of these techniques and others may be found in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
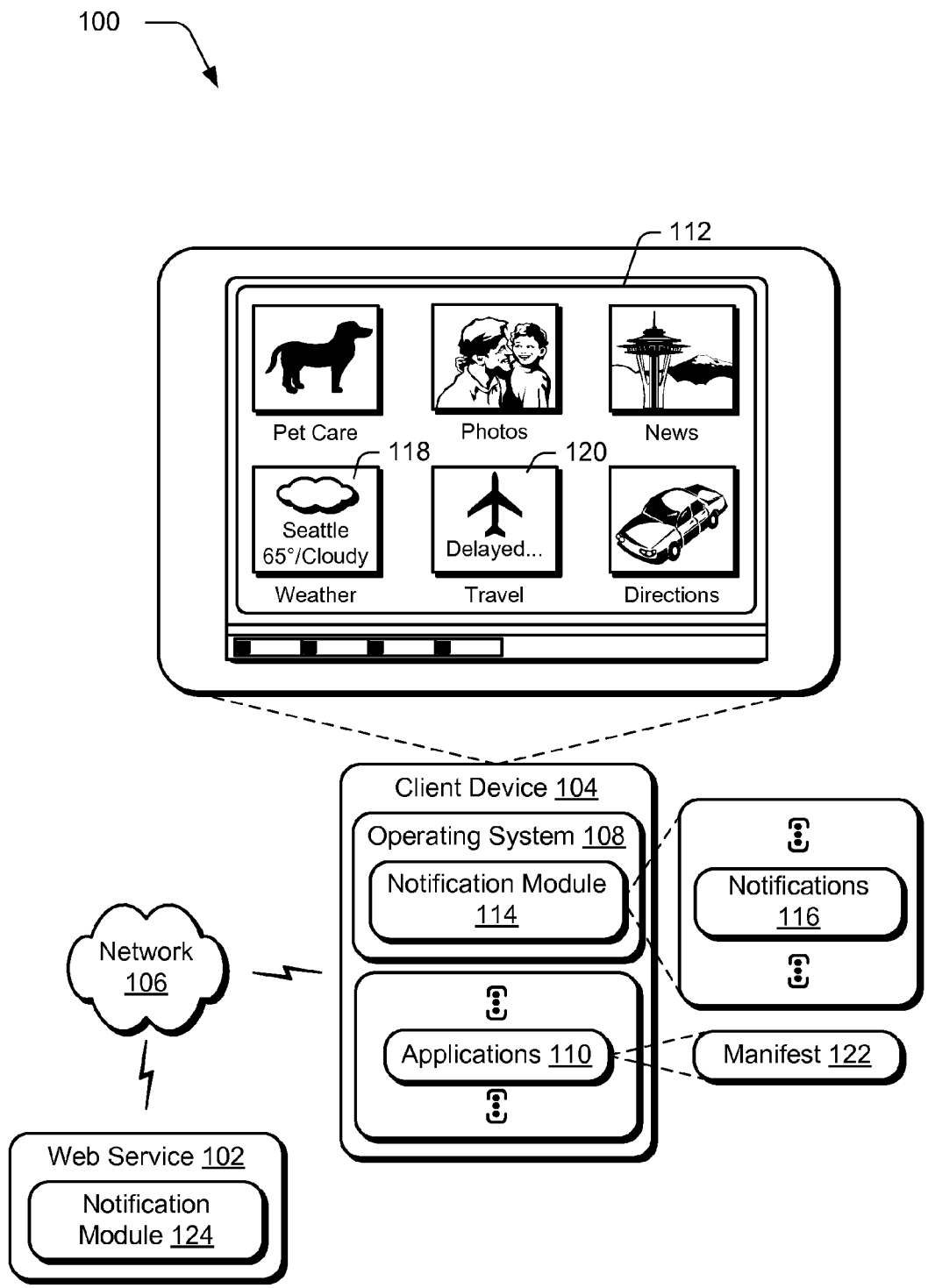
FIG. 1 is an illustration of an environment in an example implementation that is operable to employ application notification techniques.

FIG. 1 is an illustration of an environment 100 in an example implementation that is operable to employ techniques described herein. The illustrated environment 100 includes a web service 102 and a client device 104 that are communicatively coupled via a network 106. The web service 102 and the client device 104 may be implemented by a wide range of computing devices.

For example, a computing device may be configured as a computer that is capable of communicating over the network 106, such as a desktop computer, a mobile station, an entertainment appliance, a set-top box communicatively coupled to a display device, a mobile communication device (e.g., a wireless phone as illustrated for the client device 104), a game console, and so forth. Thus, a computing device may range from full resource devices with substantial memory and processor resources (e.g., personal computers, game consoles) to a low-resource device with limited memory and/or processing resources (e.g., traditional set-top boxes, hand-held game consoles). Additionally, a computing device may be representative of a plurality of different devices, such as multiple servers utilized by a business to perform operations, a remote control and set-top box combination, an image capture device and a game console configured to capture gestures, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The client device 104 is further illustrated as including an operating system 108. The operating system 108 is configured to abstract underlying functionality of the client 104 to applications 110 that are executable on the client device 104. For example, the operating system 108 may abstract processing, memory, network, and/or display functionality of the client device 104 such that the applications 110 may be written without knowing "how" this underlying functionality is implemented. The application 110, for instance, may provide data to the operating system 108 to be rendered and displayed by the display device 112 without understanding how this rendering will be performed.

The operating system 108 may also represent a variety of other functionality, such as to manage a file system and a user interface that is navigable by a user of the client device 104. An example of this is illustrated as an application launcher (e.g., desktop) that is displayed on the display device 112 of the client device 104. The desktop includes representations of a plurality of the applications 110, such as icon, tiles, textual descriptions, and so on. The desktop may be considered a root level of a hierarchical file structure. The representations shown in the illustrated example are selectable to launch a corresponding one of applications 110 for execution on the client device 104. In this way, a user may readily navigate through a file structure and initiate execution of applications of interest.

The operating system 108 is also illustrated as including a notification module 114. The notification module 114 is representative of functionality to manage notifications 116 that are to be displayed as part of the representations of the applications. For example, a representation 118 of a weather application is illustrated as including a notification that indicates a name and current weather conditions, e.g., "Seattle 65°/Cloudy." Likewise, a representation 120 for a travel application is illustrated as including a notification that indicates that a current flight status is "delayed." In this way, a user may readily view information relating to the applications 110 without having to launch and navigate through each of the applications. Although representations of specific applications are shown, other representations of applications are also contemplated, such as a representation of an application that references a user's involvement with a service, e.g., a friend in a social network service.

In one or more implementations, the notifications 116 may be managed without executing the corresponding applications 110. For example, the notification module 114 may receive the notifications 116 from a variety of different sources, such as from software (e.g., other applications executed by the client device 104), from a web service 102 via the network 106, and so on. The notification module 114 may then manage how the notifications 116 are displayed as part of the representations without executing the applications 110. This may be used to improve battery life and performance of the client device 104 by not running each of the applications 110 to output the notifications 116.

Additionally, the notification module 114 may support techniques to allow developers of the respective applications 110 to specify how the notifications 116 are to be displayed as part of the representation of the applications 110. For example, the notification module 114 may examine a manifest 122 of an application 110, such as an install manifest used to install the application 110, at runtime using a system call, and so on. The manifest 110 may describe how and when the notifications 116 are to be displayed as well as how the notifications 116 are to be managed to determine which notifications 116 are to be displayed.

The notification module 114 may also utilize a variety of other techniques to enable a developer or other entity to specify how the notifications 116 are to be displayed and managed. For instance, the notifications 116 may be communicated along with corresponding tags that specify how the notifications 116 are to be displayed and/or managed. Thus, an originator of the tags may specify how corresponding notifications 116 are to be displayed or managed. This may be performed to enable a variety of different functionality as further described in the following sections.

Although this discussion described incorporation of the notification module 114 at the client, functionality of the notification module 114 may be implemented in a variety of ways. For example, functionality of a notification module 124 may be incorporated by the web service 102 in whole or in part. The notification module 124, for instance, may process notifications received from other web services and manage the notifications for distribution to the client device 104 over the network 106.

A variety of different techniques may be utilized by the notification module 124, such as to process the notifications according to techniques that would be employed by the client device 104, itself, such as to examine a manifest, process tags, responsive to a communication received from the client device 104 that specifies the criteria to manage the notifications 116, and so on. Further, this processing may be performed in instances in which the client device 104 is unavailable, such as due to lack of a network 106 connection. In this way, the web service 102 may make efficient use of storage space and network 106 bandwidth. Other examples are also contemplated, such as to distribute the functionality of the notification module 114 between the client device 104 and the web service 102, incorporate a third-party service, and so on.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, a computing device may also include an entity (e.g., software) that causes hardware of the computing device to perform operations, e.g., processors, functional blocks, and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
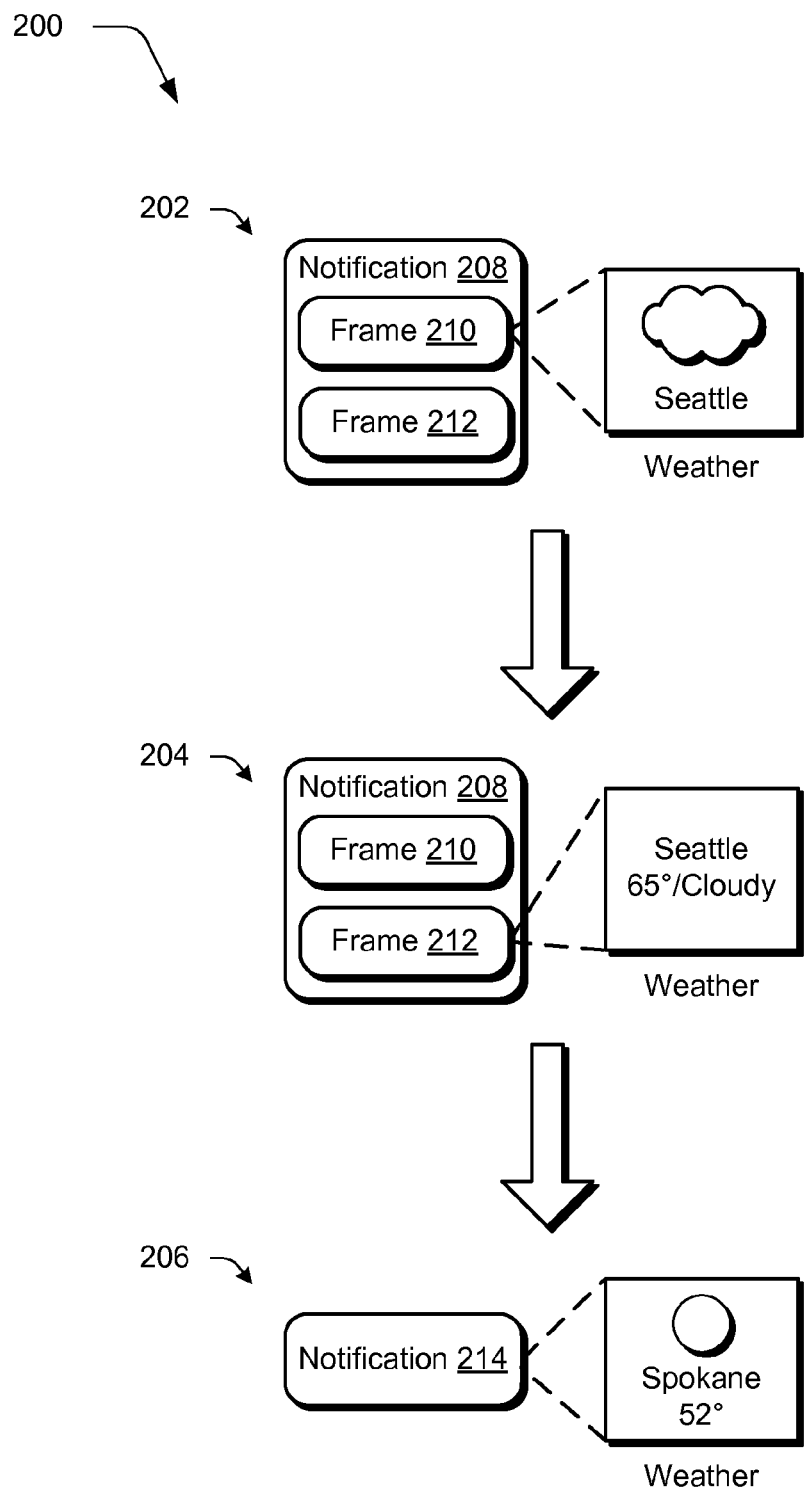
FIG. 2 depicts a system in an example implementation in which a plurality of notifications is displayed successively as part of a representation of an application.

FIG. 2 depicts a system 200 in an example implementation in which a plurality of notifications are displayed successively as part of a representation of an application. The system 200 is illustrated through use of first, second, and third stages 202, 204, 206. Notifications 116 may take a variety of forms and arranged in a variety of ways for display as part of the representation 118.

As illustrated in FIG. 2, for instance, a notification 208 having a plurality of frames 210, 212 is shown. At the first stage 202, a first 210 of the frames of the notification 208 is used to display a graphical depiction of a cloud and the text "Seattle" for a representation of a weather application.

At the second stage 204, a second 212 of the frames of the notification 208 is used to display text "Seattle" and text "65°/Cloudy" to describe additional current weather conditions for Seattle. Thus, the notification 208 may be configured to include frames 210, 212 that are to be displayed successively as part of the representation 118.

Additional notifications may also be displayed in succession as part of the representation 118. As shown at the third stage 206, for instance, a notification 214 is used to display graphics and text of a sun and current weather conditions for "Spokane, 52°." Thus, in this example system 200 the notification module 114 may be used to cycle through notifications 208, 214 for display as part of the representation 118 of an application 110. As previously stated, the management of the notifications 116 may be performed using a variety of techniques, an example of which involving tags is described in relation to the following figure.

Figure 3:
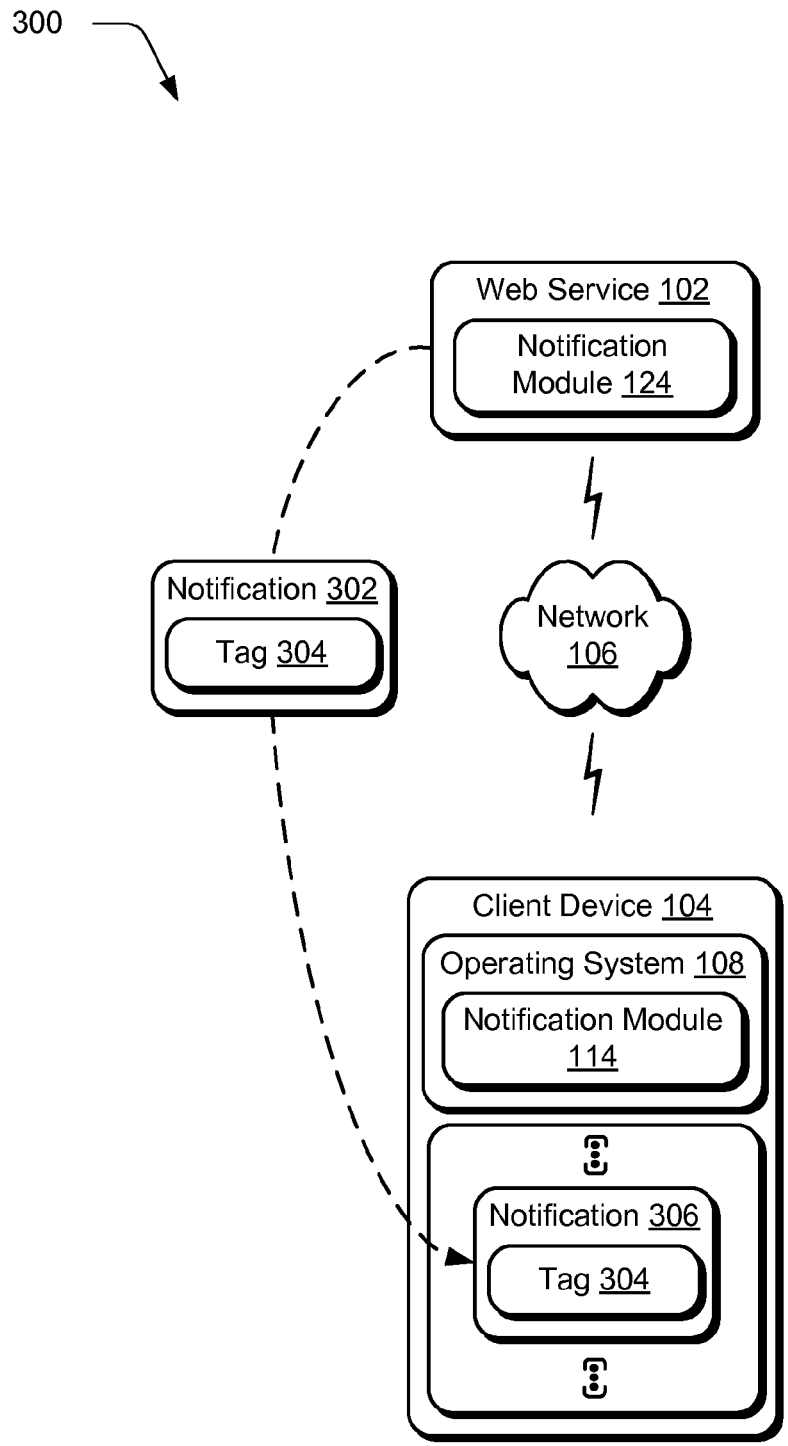
FIG. 3 depicts a system in which a tag is utilized to specify that a corresponding notification is to be used to replace another notification.

FIG. 3 depicts a system 300 in which a tag is utilized to specify that a corresponding notification is to be used to replace another notification. The web service 102 is illustrated as being communicatively coupled to the client device 104 via the network 106 as previously described in relation to FIG. 1. In this example, the web service 102 communicates a notification 302 and a corresponding tag 304 to the client device 104.

Upon receipt of the notification 302, the notification module 114 may determine that there is a corresponding tag 304. Accordingly, the notification module 114 may examine storage that is local to the client device 104 to determine whether another notification 306 has a matching tag.

In the illustrated example, notification 306 includes a tag 304 that matches the tag 304 of the received notification 302. Accordingly, the notification module 114 may replace the notification 306 with the later received notification 302. In this way, an originator of the tag 302 may readily replace one notification with another through the use of tags.

The tag 304 may be specified in a variety of ways. For instance, the tag 304 may be configured such that a value of the tag 304 may be assigned by an originator of the tag from any value. Thus, in this example the notification module 114 may manage replacement of the notifications without "knowing" what the corresponding tags "mean." A variety of other examples are also contemplated, such as to specify a particular slot in a queue, an example of which is described in relation to the following figure. Although this functionality was described in relation to the notification module 114 of the client device 104, as previously stated this functionality may be incorporated using a variety of different devices, an example of which is shown by the notification module 124 of the website 102.

Figure 4:
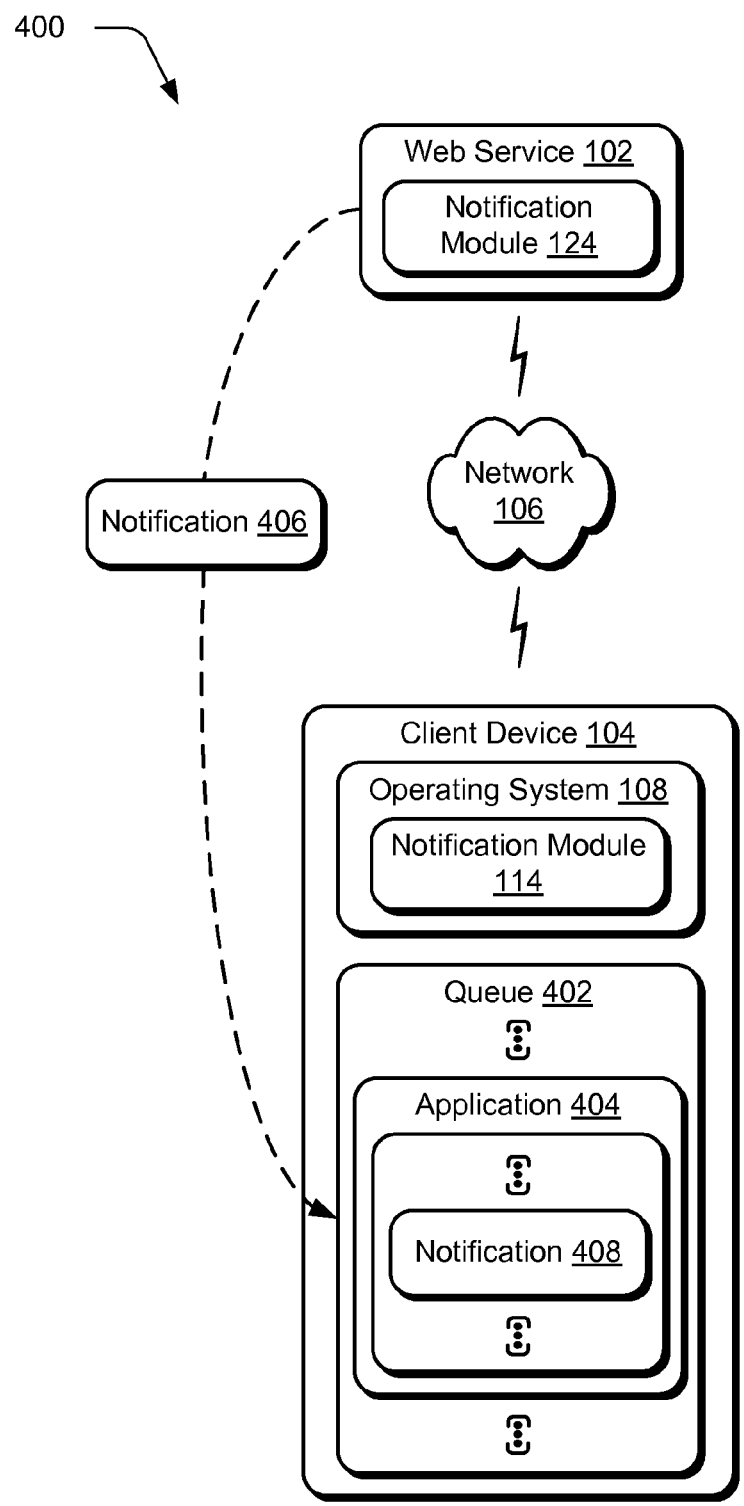
FIG. 4 is a flow diagram depicting a procedure in an example implementation in which a queue is used to manage notifications for output as part of a representation of an application.

FIG. 4 depicts a system 400 in an example implementation in which a queue is used to manage notifications 116 for output as part of a representation of an application. As before, the client device 104 is communicatively coupled to the web service 102 via a network 106. The client device 104 includes a notification module 114 that in this instance is illustrated as part of an operating system 108.

The client device 104 is also illustrated as including a queue 402 that is configured to stored notifications 116 for respective applications 404. The queue 402, for instance, may be configured to store a maximum number of notifications 116 for particular applications and thus is illustrated as "within" the application 404 in the queue 402 in the figure. It should be readily apparent, however, that the queue 402 may be configured in a variety of ways.

The notification module 114 may manage the notifications 116 using the queue 402 in a variety of ways. For example, the notification may employ a "first in/first out" (FIFO) technique to manage the notifications 116, a "last in/first out" technique, and so on. For instance, the notification module 114 may receive a notification 406 that specifies a particular slot within the queue 402. The slots, for instance, may describe a priority in which the notifications 116 are to be displayed as part of the representation. Further management techniques may leverage this specification, such as to move previous notifications 116 "downward" in priority such that a notification having the lowest priority is removed, to replace a notification 408 in the slot with the received notification 406 and preserve the ordering otherwise, and so on. Other techniques are also contemplated, such as to leverage an override command as further described in the example procedures.

Example Procedures

The following discussion describes notification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment.

Figure 5:
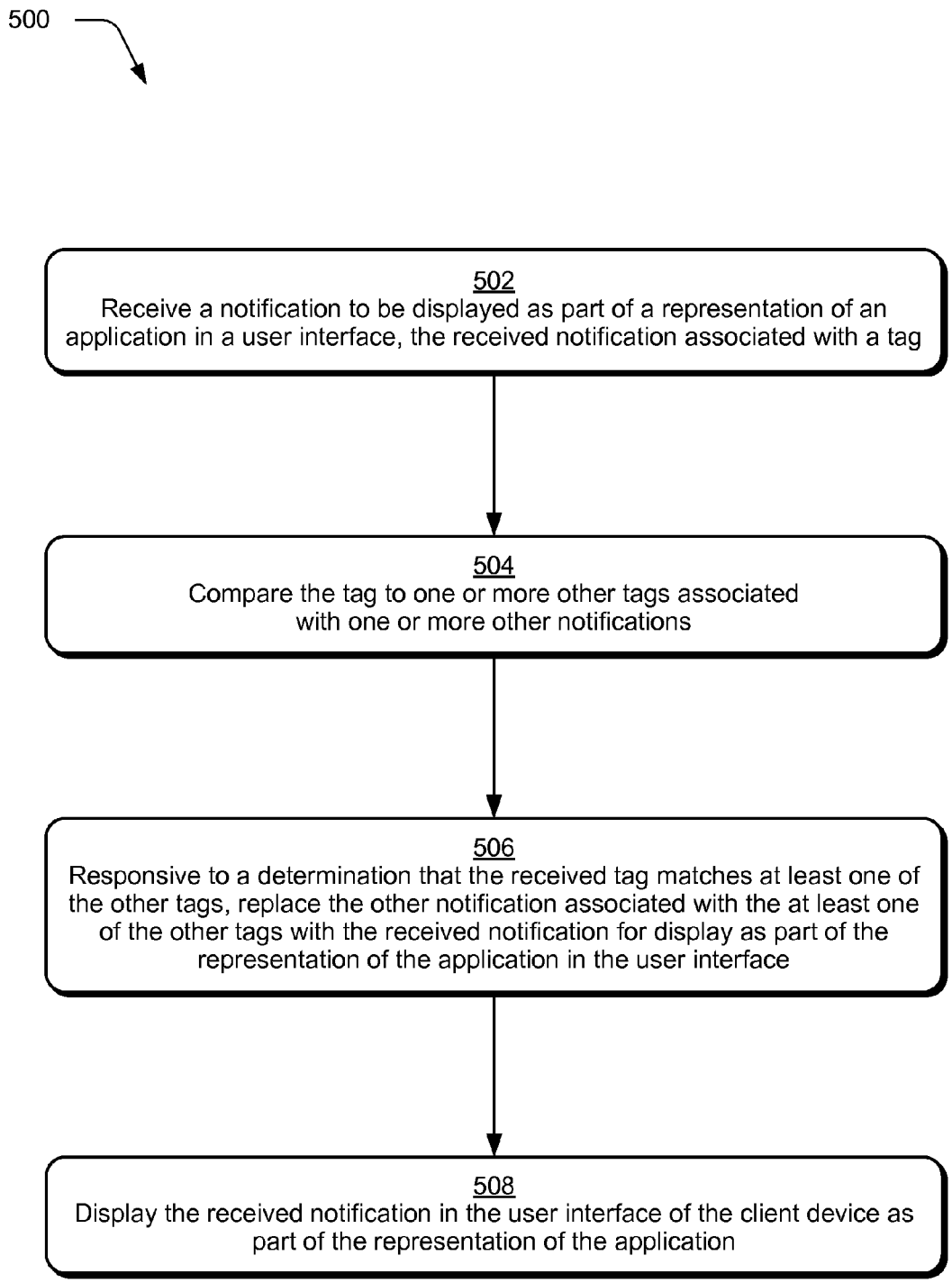
FIG. 5 is a flow diagram depicting a procedure in an example implementation in which tags are used to manage replacement of notifications for display as part of a representation of an application.

FIG. 5 depicts a procedure 500 in an example implementation in which tags are used to manage replacement of notifications for display as part of a representation of an application. A notification is received that is to be displayed as part of a representation of an application in a user interface, the notification associated with a tag (block 502). For example, the notification may be received at a notification module 114 of the client device 104 from an application executed on the client device 104, from a web service, and so on. In another example, the notification module 124 of the web service 102 may receive the notification from another web service and manage storage and distribution of the notification to the client device 104. A variety of other examples are also contemplated.

The tag of the notification is compared to one or more other tags associated with one or more other notifications (block 504). The notification module 114, for instance, may compare the tag for the notification for an application to tags of other notifications for that application to find a match.

Responsive to a determination that the received tag matches at least one of the other tags, the other notification is replaced that is associated with the at least one of the other tags with the received notification for display as part of the representation of the application in the user interface (block 506). For example, the notification module 114 may compare text strings of tags in the respective notifications to determine whether they match. Thus, in this example the text strings need not be "known" as far as "what they do or represent" to the notification module 114 to avail themselves of the replacement functionality. In this way, the notification module 114 may support varied definitions and tag identifiers and still support the replacement functionality described herein.

The received notification may then be displayed in the user interface of the client device as part of the representation of the application (block 508). The display may be performed in a variety of ways, such as part of a cycling display as described in relation to FIG. 2, a static display, a display of a representation that is selectable to launch a represented application (e.g., a tile in a application launcher output by the operating system 108), and so forth.

Additionally, the notification may be leveraged to launch a corresponding application in a context of the notification. For example, if a user installs a news application, selecting the representation of the application would launch the application to the 'home' or 'default' state of the application. In the new application example, to the front page of the paper. However, if the news application receives a notification about an earthquake and the user selected that notification, the news application may then launch in the context of that notification. For instance, the news application could be launched directly to the article about the earthquake and "skip" the home page. A variety of other examples are also contemplated.

Figure 6:
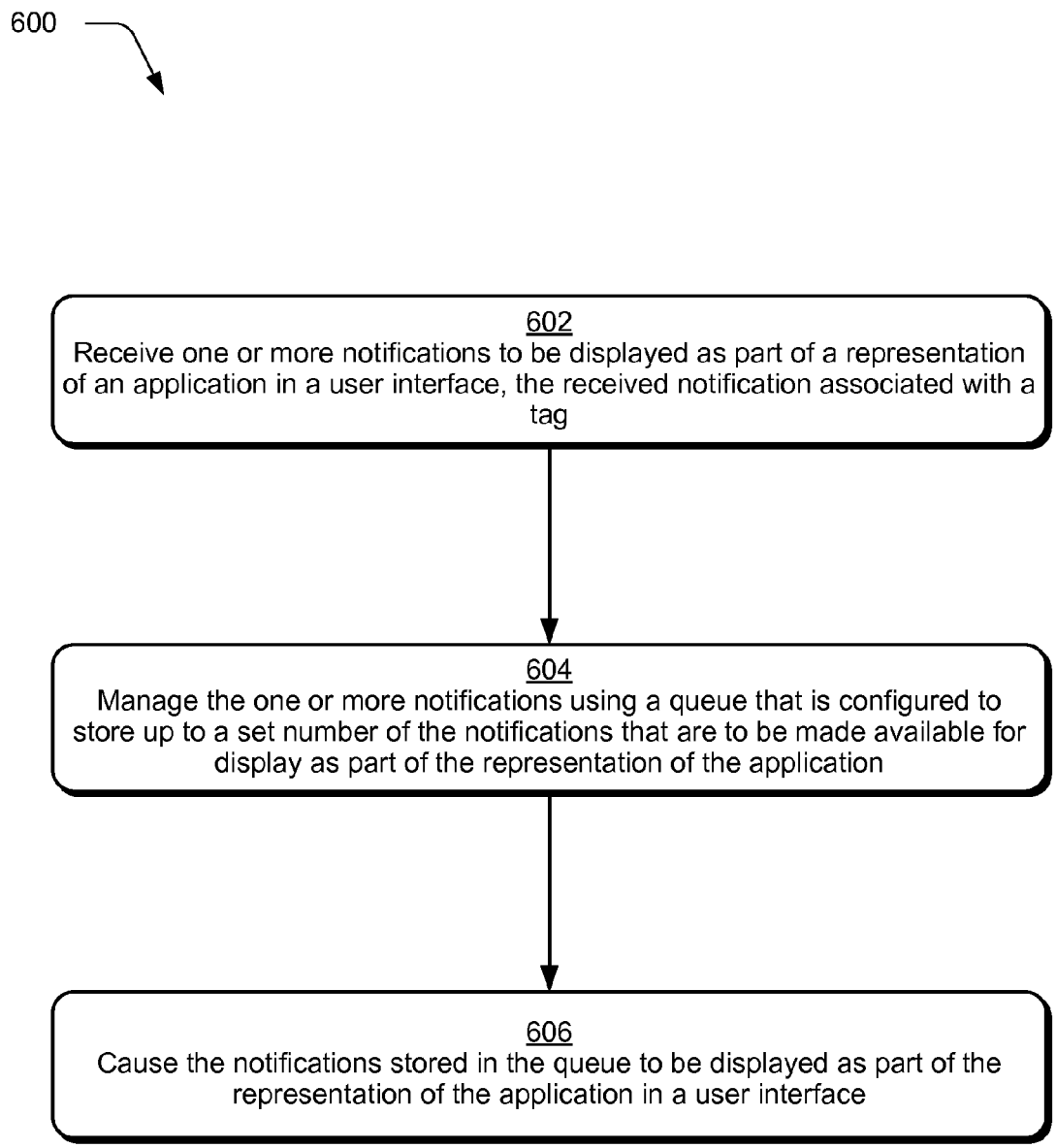
FIG. 6 is a flow diagram depicting a procedure in an example implementation in which a queue is used to manage notifications for display as part of a representation of an application.

FIG. 6 depicts a procedure 600 in an example implementation in which a queue is used to manage notifications for display as part of a representation of an application. A plurality of notifications is received that are to be displayed as part of a representation of an application in a user interface (block 602). As before, the notification may be received at a notification module 114 of the client device 104 from an application executed on the client device 104, from a web service, and so on. In another example, the notification module 124 of the web service 102 may receive the notification from another web service and manage storage and distribution of the notification to the client device 104. A variety of other examples are also contemplated.

The one or more notifications are managed using a queue that is configured to store up to a set number of the notifications that are to be made available for display as part of the representation of the application (block 604). The notifications stored in the queue are then caused to be displayed as part of the representation of the application in a user interface (block 606). The set number, for instance, may be set by a developer of the application 110, may be set by an originator a notification 116, may be predefined by the notification module 114 itself, and so on.

The notification module 114 may leverage the queue 402, which references an entity that is used to collect notifications, in a variety of ways, such as by employing a "first in/first out" technique, utilize tags that specify particular slots within the queue 402, and so on. In additional examples, the queue 402 may employ prioritization techniques, such as to specify a particular order in which the notifications 116 are to be cycled in the display and so on as further described in relation to FIG. 12. Thus, the queue 402 may be used to manage a number of notifications that are to be used for display as part of a representation of an application as well as an order in which the notifications are displayed.

As previously stated, although this functionality is described as implemented at the client, this functionality may also be implemented by a variety of other entities, such as the notification module 124 of a web service 102, distributed between the notification modules 114, 124, and so forth. Further, this functionality may be implemented by the notification module 114 without executing a represented application 110, thereby conserving processing and battery resources.

Figure 7:
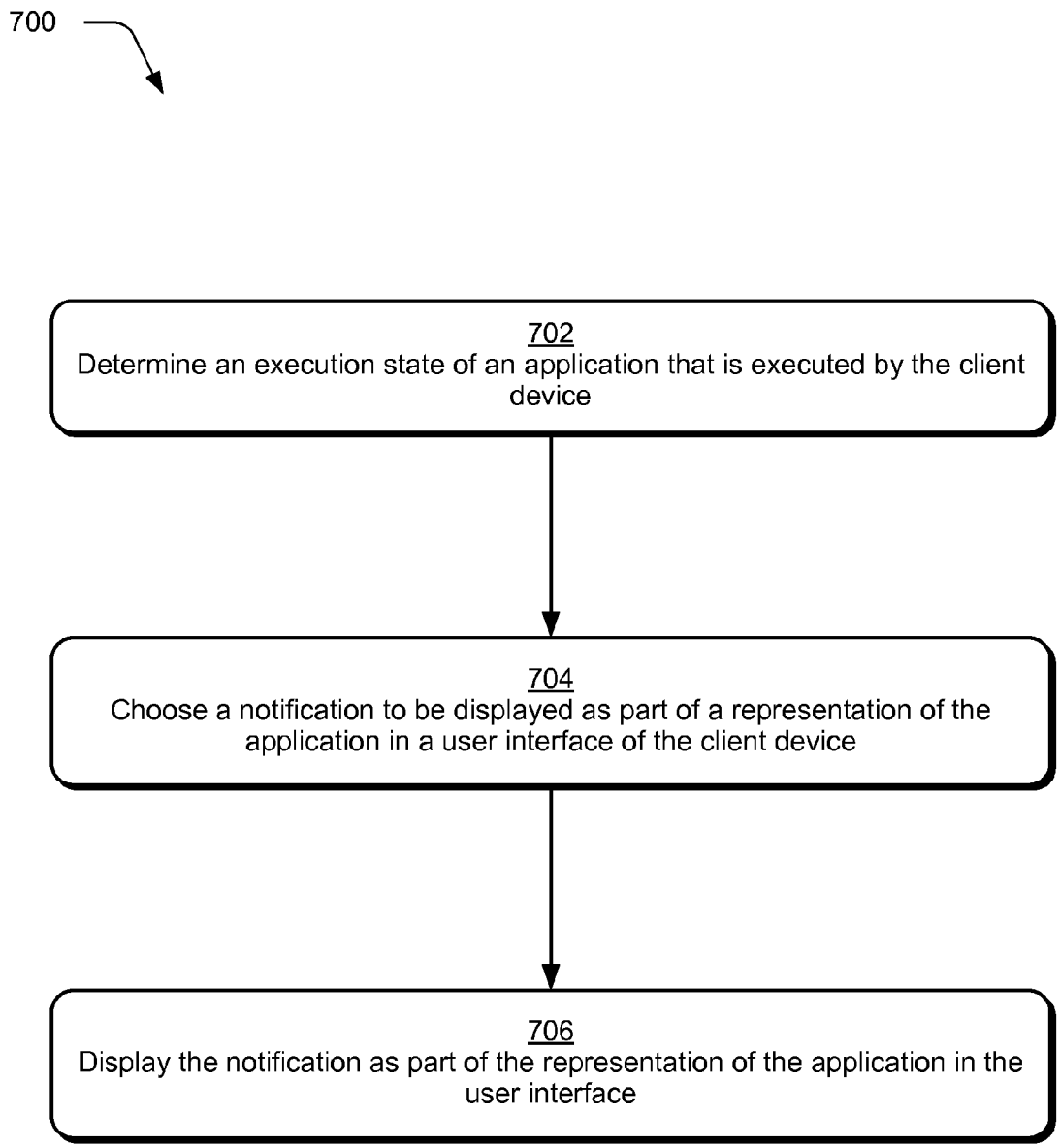
FIG. 7 is a flow diagram depicting a procedure in an example implementation in which an execution state of an application is used as a basis for determining which notifications are to be displayed as part of a representation of the application.

FIG. 7 depicts a procedure 700 in an example implementation in which an execution state of an application is used as a basis for determining which notifications are to be displayed as part of a representation of the application. An execution state of an application that is executed by a client device is determined (block 702). For example, the notification module 114 may monitor an application 110 that is configured to render content, such as a music-playing application. The notification module 114 may then determine that the application 110 is executed to render a particular item of content, such as a particular song.

A notification is chosen to be displayed as part of a representation of the application in a user interface of the client device (block 704). The notification is displayed as part of the representation of the application in the user interface (block 706). Continuing with the previous example, the notification module 114 may determine a name of the particular item of content that is being executed. This name may then be displayed as part of the representation of the application, such as a representation of the application that is selectable to launch the application.

For instance, a user may select a playlist in a music-playing application of the client device 104 and then navigate away from the application to locate other applications of interest. The music-playing application may continue to render content, e.g., the particular song, as the user performs this navigation. To provide context to a user regarding the state of the application, the notification may describe this execution state, which in this instance may include the rendered content, e.g., title, artist, album, and so on. A variety of other examples are also contemplated that involve display of notifications within representations of applications that describe the execution state of the application and the representation is selectable to output a user interface of that application, e.g., a window that includes the user interface being brought "to the front" such that a user may interact with the application.

Figure 8:
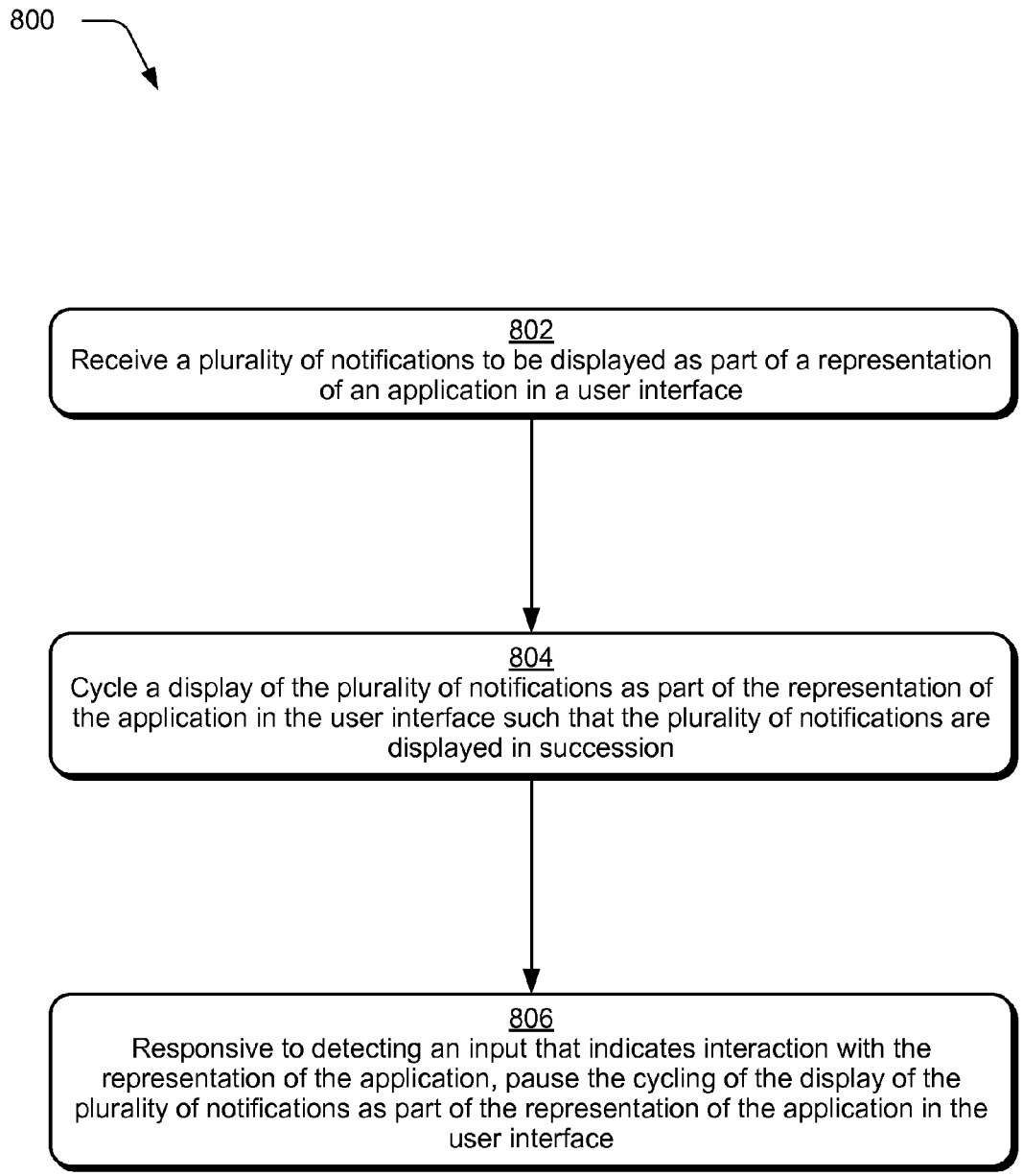
FIG. 8 is a flow diagram depicting a procedure in an example implementation in which notifications are displayed within representations of applications that are selectable to launch the application, the display cycled to display the notifications in succession.

FIG. 8 depicts a procedure 800 in an example implementation in which notifications are displayed within representations of applications that are selectable to launch the application, the display cycled to display the notifications in succession. A plurality of notifications is received that are to be displayed as part of a representation of an application in a user interface (block 802). As before, the notification may be received at a notification module 114 of the client device 104 from an application executed on the client device 104, from a web service, and so on. In another example, the notification module 124 of the web service 102 may receive the notification from another web service and manage storage and distribution of the notification to the client device 104. A variety of other examples are also contemplated.

A display is cycled of the plurality of notifications as part of the representation of the application in the user interface such that the notifications are displayed in succession (block 804). As previously described in relation to FIG. 2, for instance, a representation 118 may be displayed to include notifications that are cycled in succession, one after another, to display a wide variety of information.

In this way, the notifications may expand on the amount of information that may be displayed without navigating "within" execution of the application. As previously described, this may also be performed by the notification module 114 without launching the application 110, thereby conserving battery and/or processing resources of the client device 104, servers of the web service 102, computing devices of third-party entities, and so on.

In one or more implementations, the cycling of the display of the plurality of notifications as part of the representation of the application in the user interface is paused responsive to detecting an input that indicates interaction with the representation of the application (block 806), e.g., with the application itself and/or other applications that are displayed "nearby." For example, the display of the notifications may be configured for automatic cycling by the notification module 114 without user intervention.

However, if an input is detected that involves likely interaction with the representation, such as a gesture, selection using a cursor control device, and so on, the cycling may be paused. A variety of other implementations are also contemplated, such as cycling that is performed responsive to detection of an input (e.g., "hovering" of a cursor, gesture, and so on) that indicates a likely desire to cause the cycling, which may then be paused when the detection of the input ceases. In another example, detection of an input (e.g., a gesture) may be utilized to display each of the notifications concurrently in a user interface.

FIG. 9 depicts a procedure 900 in an example implementation in which subsets of notifications are cycled for display as part of respective representations of applications. A plurality of notifications is received to be displayed as part of respective representations of a plurality of applications in a user interface (block 902). As before, this receipt may be performed by a variety of entities and the notifications may be received from a variety of sources, such as received by the notification module 114 of the client device 104.

The plurality of notifications is displayed as part of the representations of the applications in the user interface such that different subsets of the notifications of the applications are cycled at different points in time (block 904). Referring to FIG. 1, for instance, six different representations of applications are displayed on the display device 112 of the client device 104. In an instance in which notifications are received for display for each of the representations, it may be desirable to cycle different subsets of the notifications at different points in time so as to reduce "clutter" in the display. For instance, notifications for the weather and news may be cycled at a first point in time, notifications for the pet care and directions at a second subsequent point in time, and so on. Thus, the subsets may be used to reduce distractions that may be caused if a large number of notifications were "moving" at any one point in time.

Figure 10:
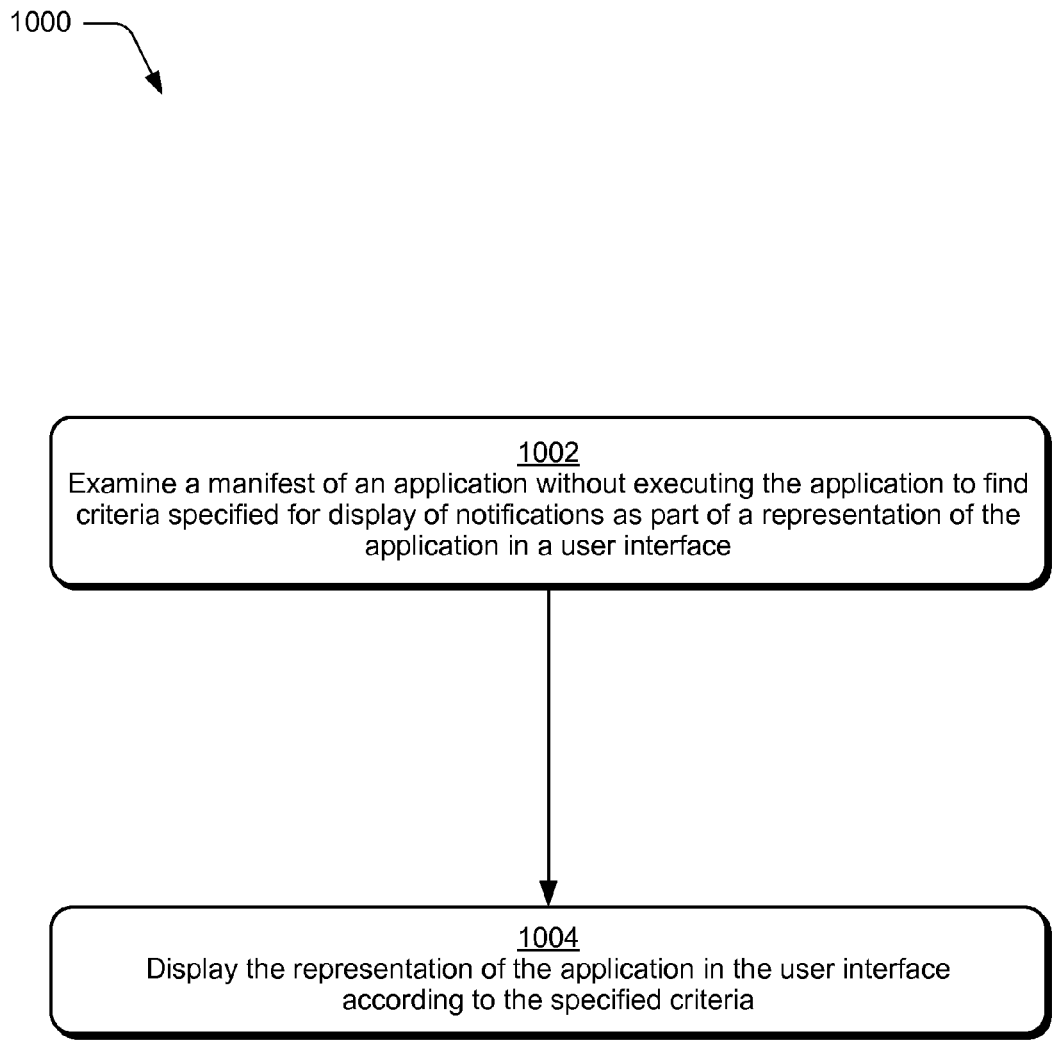
FIG. 10 is a flow diagram depicting a procedure in an example implementation in which in which a manifest of an application is utilized to specify criteria to be used to manage display of notifications as part of a representation of an application.

FIG. 10 depicts a procedure 100 in an example implementation in which a manifest of an application is utilized to specify criteria to be used to manage display of notifications as part of a representation of an application. A manifest is examined of an application without executing the application to find criteria specified for display of notifications as part of a representation of the application in a user interface (block 1002). For example, the notification module 114 may examine an install manifest to be used to specify a variety of criteria and may do so without launching the application. Examples of the criteria include specifying the set number to be used for a queue, whether tags (e.g., replacement or override tags) are to be supported, a time period to be used for cycling the notifications, whether the notifications are to be linked with other notifications of other applications to form predefined subsets, a source of the notifications, whether cycling is to be performed automatically and without user intervention or responsive to s user input, and so forth. Thus, the notification module 114 may enable developers of the application to specify how notifications are to be displayed as part of representations of the application. A variety of other examples are also contemplated, such as use of a function call at runtime.

The representation of the application is displayed in the user interface according to the specified criteria (block 1004). For instance, the representation may be displayed as part of an application launcher (e.g., desktop) used by the operating system 108 as a root level of a file system. A variety of other instances are also contemplated, such as at different points in the hierarchy.

Figure 11:
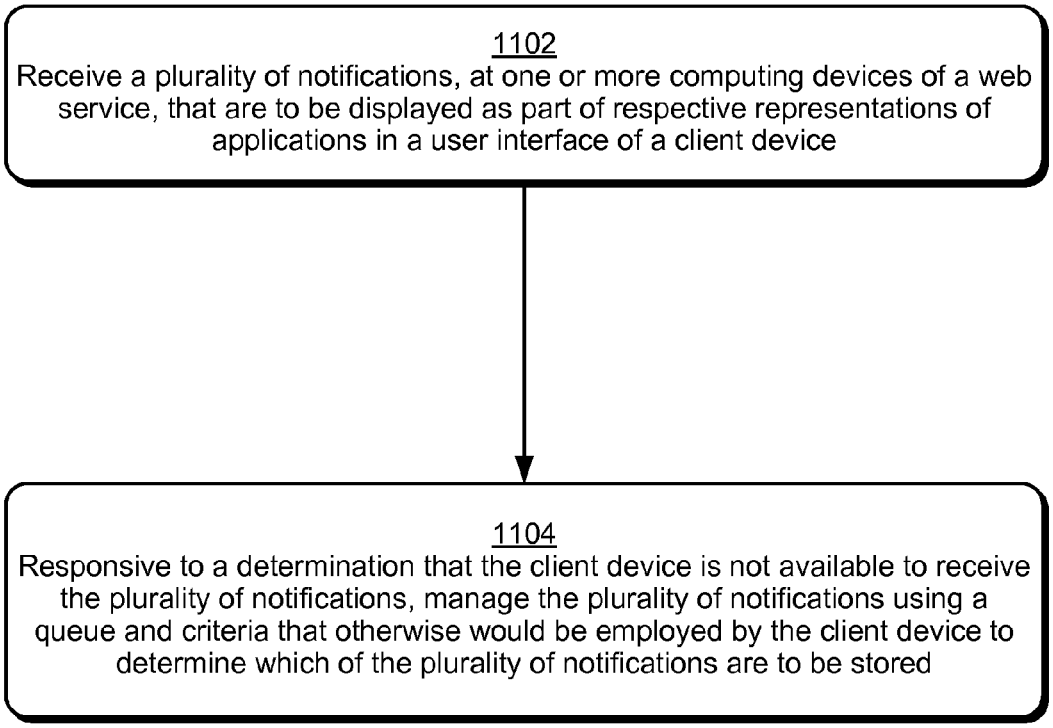
FIG. 11 is a flow diagram depicting a procedure in an example implementation in which a web service is utilized to manage provision of notifications to a client device for display.

FIG. 11 depicts a procedure 1100 in an example implementation in which a web service is utilized to manage provision of notifications to a client device for display. A plurality of notifications are received at one or more computing devices of a web service, that are to be displayed as part of representations of applications in a user interface of a client device (block 1102). As previously described, a web service 102 may receive notifications 116 for communication to a client device 104 via a network 104.

Responsive to a determination that the client device is not available to receive the plurality of notifications, the plurality of notifications are managed using a queue and criteria that otherwise would be employed by the client device to determine which of the plurality of notifications are to be stored in the queue (block 1104). For example, the web service 102 may receive a communication that describes which applications are included on the client device 104 and how those applications are managed. In another example, the web service 102 may base this management on the notifications 116 themselves, e.g., tags included in the notifications. A variety of other examples are also contemplated. In this way, the notification module 124 of the web service 102 may efficiently manage notifications 116 to preserve memory space and reduce consumption of network 106 bandwidth.

Figure 12:
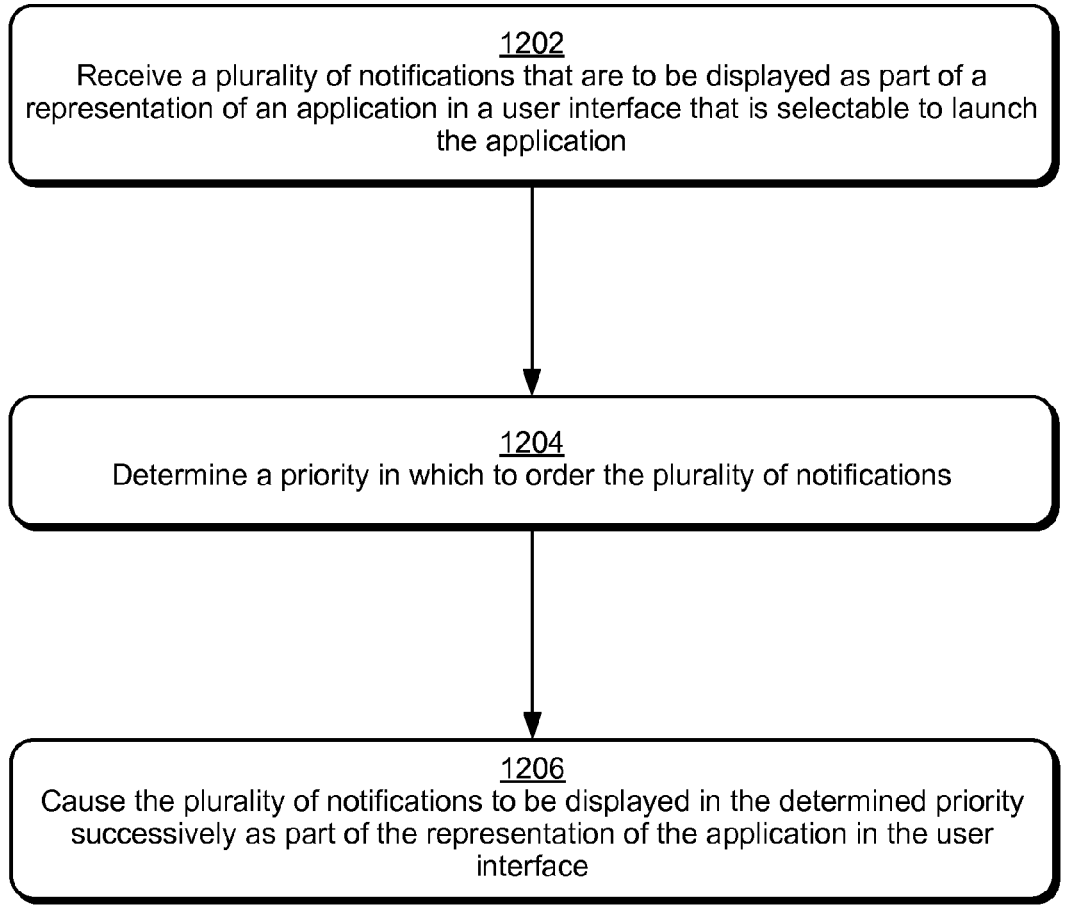
FIG. 12 is a flow diagram depicting a procedure in an example implementation in which notifications are prioritized for display as part of a representation of an application.

FIG. 12 depicts a procedure 1200 in an example implementation in which notifications are prioritized for display as part of a representation of an application. As before, a plurality of notifications is received that are to be displayed as part of a representation of an application in a user interface that is selectable to launch the application (block 1202).

A priority in which to order the plurality of notifications is determined (block 1204). The notification module 114, for instance, may employ a "first in/first out" technique to manage which notifications are to be stored in a queue 402. In another example, priorities may be assigned by an originator of the notification, such as a hierarchical value, specific slot within a queue 402, and so on. The priority may also be determined by the notification module 114 based on a variety of other criteria, such as whether the notification has been displayed already versus whether this will be the first time.

The plurality of notifications is caused to be displayed in the determined priority successively as part of the representation of the application in the user interface (block 1206). The notification module 124, for instance, may communicate the notifications 116 and/or the priority to the client device 104. In another instance, the notification module 114 may determine the priority and cause the notifications to be rendered within the representation of the application 110. A variety of other examples are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   displaying a representation of an application in a user interface;
   receiving one or more notifications that pertain to the application to be displayed as part of the representation of the application in the user interface;
   examining a manifest of the application without executing the application to find criteria specifying how and when the notifications are to be displayed as part of the representation of the application in the user interface; and
   displaying the representation of the application as including the one or more notifications in the user interface according to the specified criteria.

2. A method as described in claim 1, wherein the representation is selectable to launch the application.

3. A method as described in claim 1, wherein the notification is selectable as part of the representation to launch the application in a context of the notification.

4. A method as described in claim 1, wherein the display is performable without executing the application.

5. A method as described in claim 1, wherein the examining and the displaying are caused to be performed by execution of an operating system by the one or more computing devices.

6. A method as described in claim 1, wherein the criteria specifies that a queue is to be used to manage the notifications that are to be made available for display as part of the representation of the application.

7. A method as described in claim 6, wherein the criteria specifies a maximum number of the notifications that are to be stored using the queue.

8. A method as described in claim 1, wherein the criteria specifies whether display of the notification as part of the representation of the application is permitted.

9. A method as described in claim 1, wherein the criteria specifies whether cycling a display of the notifications as part of the representation of the application in the user interface such that the plurality of notifications are displayed in succession is enabled or disabled.

10. A method comprising:
    receiving a plurality of notifications, at one or more computing devices of a web service, that are to be displayed as part of a cycled display within respective representations of applications in a user interface of a client device; and
    responsive to a determination that the client device is not available to receive the plurality of notifications, managing the plurality of notifications using a queue and criteria that otherwise would be employed by the client device to determine which of the plurality of notifications are to be stored in the queue for subsequent communication to the client device, the criteria otherwise employed by the client device determined by examining a manifest specifying how and when notifications are to be displayed.

11. A method as described in claim 10, wherein the criteria are determined based on applications that are installed on the client device.

12. A method as described in claim 10, wherein the criteria are determined by examining at least one install manifest of an application that is installed on the client device or using system function call at runtime.

13. A method as described in claim 10, wherein the criteria are specified via a communication received at the web service from the client device.

14. A method implemented by one or more computing devices, the method comprising:
    receiving a plurality of notifications that are to be displayed as part of a representation of an application in a user interface that is selectable to launch the application, the representation of the application having a plurality of frames for displaying a graphical depiction and text;
    examining a manifest of the application to find criteria specifying how and when the plurality of notifications are to be displayed as part of the representation of the application in the user interface;
    determining a priority in which to order the plurality of notifications; and
    causing the plurality of notifications to be displayed in the determined priority successively as part of a cycling of a display within the representation of the application in the user interface.

15. A method as described in claim 14, wherein the priority is based at least in part on whether a corresponding said notification has already been displayed.

16. A method as described in claim 14, wherein the priority is based at least in part on values assigned by an originator of a respective said notification.

17. A method as described in claim 14, wherein the priority is based at least in part on values assigned to respective said notifications that indicate a particular slot in a queue.

18. A method as described in claim 14, wherein the receiving, the examining the determining, and the causing are performed by the one or more computing devices as part of a web service.

19. A method as described in claim 14, wherein the receiving, the examining the determining, and the causing are performed by an operating system of the one or more computing devices configured as a client device.

20. A method as described in claim 14, wherein the receiving, the examining the determining, and the causing are performed without executing the application.

* * * * *